United States Patent
Behrendt et al.

(10) Patent No.: US 9,171,151 B2
(45) Date of Patent: Oct. 27, 2015

(54) REPUTATION-BASED IN-NETWORK FILTERING OF CLIENT EVENT INFORMATION

(71) Applicant: Microsoft Corporation, Redmond, WA (US)

(72) Inventors: Daniel P. Behrendt, Bellevue, WA (US); Vernon R. Groves, Duvall, WA (US); John F. Arnold, Monroe, WA (US); Md Ahsan Arefin, Champaign, IL (US)

(73) Assignee: Microsoft Technology Licensing, LLC, Redmond, WA (US)

(*) Notice: Subject to any disclaimer, the term of this patent is extended or adjusted under 35 U.S.C. 154(b) by 48 days.

(21) Appl. No.: 13/678,556

(22) Filed: Nov. 16, 2012

(65) Prior Publication Data

US 2014/0143825 A1    May 22, 2014

(51) Int. Cl.
*H04L 29/00*        (2006.01)
*G06F 21/55*        (2013.01)
*H04L 29/06*        (2006.01)

(52) U.S. Cl.
CPC .......... *G06F 21/552* (2013.01); *H04L 63/0227* (2013.01); *H04L 63/102* (2013.01)

(58) Field of Classification Search
CPC ..... H04L 9/32; H04L 29/06877; H04L 63/14; H04L 2025/03503; H04L 12/2488; H04L 12/2615; H04L 12/585; H04L 29/06578; H04L 63/0227; H04L 63/102; G06F 21/50; G06F 21/564; G06F 21/56; G06F 21/00; G06F 11/00; G06F 21/552
See application file for complete search history.

(56) References Cited

U.S. PATENT DOCUMENTS

| | | | |
|---|---|---|---|
| 7,761,912 B2 * | 7/2010 | Yee et al. | 726/11 |
| 7,937,480 B2 | 5/2011 | Alperovitch et al. | |
| 8,239,915 B1 * | 8/2012 | Satish et al. | 726/1 |
| 8,353,021 B1 * | 1/2013 | Satish et al. | 726/11 |
| 8,484,730 B1 * | 7/2013 | P. R. | 726/22 |
| 8,707,388 B1 * | 4/2014 | Bianco et al. | 726/1 |
| 2005/0209874 A1 * | 9/2005 | Rossini | 705/1 |
| 2006/0009994 A1 * | 1/2006 | Hogg et al. | 705/1 |
| 2006/0015942 A1 * | 1/2006 | Judge et al. | 726/24 |
| 2006/0136294 A1 | 6/2006 | Linden et al. | |
| 2006/0253909 A1 * | 11/2006 | Cherepov | 726/26 |
| 2007/0255821 A1 | 11/2007 | Ge et al. | |
| 2008/0028463 A1 | 1/2008 | Dagon et al. | |

(Continued)

OTHER PUBLICATIONS (Npl Search).*

(Continued)

*Primary Examiner* — Michael Pyzocha
(74) *Attorney, Agent, or Firm* — Dan Choi; Judy Yee; Micky Minhas

(57) ABSTRACT

A policy management system is described herein which generates rules based, at least in part, on reputation information provided by at least one reputation source and client event information forwarded by filtering logic. The policy management system then deploys the rules to the filtering logic. The filtering logic, which resides in-network between clients and at least one service, uses the rules to process client event information sent by the clients to the service(s). In one illustrative environment, the service corresponds to an ad hosting service, which uses the policy management system and filtering logic to help prevent malicious client traffic from reaching the ad host service, or otherwise negatively affecting the ad hosting service.

19 Claims, 20 Drawing Sheets

(56) References Cited

U.S. PATENT DOCUMENTS

| | | | |
|---|---|---|---|
| 2009/0006569 A1* | 1/2009 | Morss et al. | 709/206 |
| 2009/0219937 A1* | 9/2009 | Liu et al. | 370/392 |
| 2009/0254663 A1* | 10/2009 | Alperovitch et al. | 709/227 |
| 2010/0064341 A1* | 3/2010 | Aldera | 726/1 |
| 2010/0077445 A1* | 3/2010 | Schneider et al. | 726/1 |
| 2010/0188975 A1* | 7/2010 | Raleigh | 370/230.1 |
| 2010/0199345 A1* | 8/2010 | Nadir | 726/11 |
| 2010/0235915 A1 | 9/2010 | Memon et al. | |
| 2010/0306138 A1* | 12/2010 | Hotes et al. | 706/12 |
| 2011/0030045 A1* | 2/2011 | Beauregard et al. | 726/9 |
| 2011/0185424 A1* | 7/2011 | Sallam | 726/23 |
| 2011/0307331 A1* | 12/2011 | Richard et al. | 705/14.45 |
| 2012/0030750 A1* | 2/2012 | Bhargava et al. | 726/13 |
| 2012/0060219 A1* | 3/2012 | Larsson et al. | 726/23 |
| 2012/0210420 A1* | 8/2012 | Rybalko | 726/22 |
| 2013/0007257 A1* | 1/2013 | Ramaraj et al. | 709/224 |
| 2013/0042294 A1* | 2/2013 | Colvin et al. | 726/1 |
| 2013/0097699 A1* | 4/2013 | Balupari et al. | 726/22 |
| 2013/0179491 A1* | 7/2013 | Bennett et al. | 709/203 |
| 2013/0253940 A1* | 9/2013 | Zziwa | 705/2 |
| 2013/0312097 A1* | 11/2013 | Turnbull | 726/24 |

OTHER PUBLICATIONS

Rajab, et al., "A Multifaceted Approach to Understanding the Botnet Phenomenon," retrieved at <<http://acm.org>>, Proceedings of the 6th ACM SIGCOMM Conference on Internet Measurement, 2006, pp. 41-52.

Buehrer, et al., "A Large-scale Study of Automated Web Search Traffic," retrieved at <<http://acm.org>>, Proceedings of the 4th International Workshop on Adversarial Information Retrieval on the Web, 2008, pp. 1-8.

Caballero, et al., "Measuring Pay-per-Install: The Commoditization of Malware Distribution," retrieved at <<http://static.usenix.org/events/sec11/tech/full_papers/Caballero.pdf>>, Proceedings of the 20th Usenix Security Symposium, Aug. 2011, 16 pages.

Caballero, et al., "Dispatcher: Enabling Active Botnet Infiltration Using Automatic Protocol Reverse-Engineering," retrieved at <<http://bitblaze.cs.berkeley.edu/papers/dispatcher_ccs09.pdf>>, Proceedings of the 16th ACM Conference on Computer and Communications Security, 2009, 14 pages.

Chen, et al., "Automating Network Application Dependency Discovery: Experiences, Limitations, and New Solutions," retrieved at <<http://research.microsoft.com/pubs/136789/orion.pdf>>, Proceedings of the 8th USENIX Symposium on Operating Systems Design and Implementation, 2008, 14 pages.

Cho, et al., "Insights from the Inside: A View of Botnet Management from Infiltration," retrieved at <<http://www.cs.berkeley.edu/~dawnsong/papers/2010%20botnet%20management.pdf>>, Proceedings of the 3rd USENIX Conference on Large-scale Exploits and Emergent Threats: Botnets, Spyware, Worms, and More, 2010, 8 pages.

Curtis, et al., "DevoFlow: Scaling Flow Management for High-Performance Networks," retrieved at <<http://acm.org>>, Proceedings of the ACM SIGCOMM 2011 Conference, Aug. 2011, pp. 254-265.

Daswani, et al., "The Anatomy of Clickbot.A," retrieved at <<http://static.usenix.org/event/hotbots07/tech/full_papers/daswani/daswani_html>>, Proceedings of the First Workshop on Hot Topics in Understanding Botnets, 2007, 19 pages.

Moshchuk, et al., "Studying Spamming Botnets Using Botlab," retrieved at <<ftp://ftp.cs.washington.edu/tr/2008/10/UW-CSE-08-10-01.PDF>>, Proceedings of the 6th USENIX Symposium on Networked System Design and Implementation, 2009, 16 pages.

Miller, et al., "What's Clicking What? Techniques and Innovations of Today's Clickbots," retrieved at <<http://www.cs.berkeley.edu/~pearce/papers/clickbots_dimva_2011.pdf>> Proceedings of the 8th International Conference on Detection of Intrusions and Malware, and Vulnerability Assessment, Jul. 2011, 20 pages.

Polychronakis, et al., "Ghost turns Zombie: Exploring the Life Cycle of Web-based Malware," retrieved at http://static.usenix.org/event/leet08/tech/full_papers/polychronakis_html/>>, Proceedings of the 1st Usenix Workshop on Large-Scale Exploits and Emergents Threats, Article No. 11, 2008, 15 pages.

Staryer, et al., "Botnet Detection Based on Network Behavior," retrieved at <<http://www.ir.bbn.com/documents/articles/BotnetDetectChapter.pdf>>, in Botnet Detection: Countering the Largest Security Threat, Lee, et al. (eds.), Springer 2008, 29 pages.

Greenberg, Andy, "Google Faces the Slickest Click Fraud Yet," retrieved at <<http://www.forbes.com/2010/01/12/google-click-fraud-tech-security-trafficsolar.html, Forbes, Jan. 12, 2010, 4 pages.

"Botnet Intelligence Reviews," retrieved at <<http://www.microsoft.com/security/sir/story/default.aspx#!botnetreviews>>, Microsoft Security Intelligence Report, retrieved on Nov. 23, 2012, 1 page.

"Exposing Click Fraud: Using Web Analytics to Identify Possible Click Fraud," retrieved at <<http://www.hitslink.com/whitepapers/clickfraud.pdf>>, Net Applications, Aliso Viejo, California, 2009, 7 pages.

Bloch, et al., "How to Defend Your Website Against Click Fraud," retrieved at <<http://www.lazworld.com/whitepapers/Clicklab-howtodefend.pdf, Clicklab, LLC, Miami, Florida, 2004, 20 pages.

"adCenter Campaign and Conversion Analytics Get-Started Guide," <<http://advertising.microsoft.com/wwdocs/user/en-us/researchlibrary/researchreport/CampaignAnalytics-GetStarted.pdf>>, Microsoft Advertising, Microsoft Corporation, Redmond, Washington, 2010, 17 pages.

"What is a Botnet?," retrieved at http://www.microsoft.com/security/sir/story/default.aspx#!botnetsection>>, Microsoft Security Intelligence Report, retrieved on Nov. 23, 2012, 2 pages.

"Combating Botnets Using the Cisco ASA Botnet Traffic Filter," retrieved at <<http://www.cisco.com/en/US/prod/collateral/vpndevc/ps6032/ps6094/ps6120/white_paper_c11-532091.pdf>>, Cisco Systems, Inc., San Jose, CA, copyright date: 2009, 11 pages.

Immorlica, et al., "Click Fraud Resistant Methods for Learning Click-Through Rates," retrieved at <<http://research.microsoft.com/pubs/74345/16-fulltext.pdf>>, Proceedings of the 1st International Workshop on Internet and Network Economics, WINE 2005, Lecture Notes in Computer Science, vol. 3828, Springer-Verlag, 2005, 12 pages.

\* cited by examiner

REPUTATION-BASED IN-NETWORK FILTERING OF CLIENT EVENT INFORMATION

BACKGROUND

Online services are subject to various threats. For example, a malicious entity may orchestrate a click fraud campaign by using a collection of software agents (commonly referred to as BOTs) to automatically click on advertisements. In another case, a malicious entity may perform a distributed denial of service (DDOS) attack by sending a large amount of bogus traffic to a service. In another case, a malicious entity may attempt to steal information from a service by repetitively attempting to exploit vulnerabilities in the service. In another case, a malicious entity may direct fake traffic to its own site for the purpose of elevating its ranking score in a search engine. These examples are cited by way of illustrative, not limitation; many other types of malicious activity are prevalent in today's network environments.

In some cases, an administrator of a service can manually correct or ameliorate the damage caused by an attack that has already occurred, once discovered. This approach, however, is neither efficient nor fully effective in all situations.

SUMMARY

According to one illustrative implementation, a policy management system is described herein which generates rules based, at least in part, on at least one of: a) on reputation information provided by at least one reputation source; and b) client event information (CEI) forwarded by filtering logic. The policy management system then deploys the rules to the filtering logic. The filtering logic resides anywhere between a collection of clients and one or more services with which the clients may interact; for this reason, the filtering logic may be regarded as an "in-network" mechanism.

According to another illustrative aspect, the filtering logic uses the rules to process CEI sent by clients to at least one service. Upon discovering an instance of CEI that matches a rule, the filtering logic can take one or more prescribed actions. For instance, the filtering logic can block, tag, and/or reroute the instance of the CEI that matches a rule, or simply pass the instance of the CEI to the target service without modification.

In one illustrative environment, the service corresponds to an ad hosting service. In this context, some clients correspond to legitimate users who are interacting with ads provided by the ad hosting service. Other clients correspond to malicious devices which are taking part in a click fraud campaign. The in-network filtering logic and policy management system help prevent malicious CEI from reaching the ad hosting service, or otherwise negatively affecting the ad hosting service. In other words, the filtering logic and policy management system proactively address the threats posed by malicious clients, rather than, or in addition to, relying on the ad hosting service to perform post-correction to address already-processed fraudulent CEI. According to another illustrative characteristic, the filtering logic and policy management system may help simplify the processing performed by the ad hosting service and the network infrastructure leading to the ad hosting service.

Alternatively, or in addition, the policy management system can generate rules that attempt to identify CEI having other, potentially non-malicious, characteristics. In other words, in this type of environment, the policy management system can generate rules which are not aimed at detecting and eliminating threats, but rather serve some other policy objective or objectives.

The above approach can be manifested in various types of systems, components, methods, computer readable storage media, data structures, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes illustrative functionality for generating rules for deployment to in-network filtering logic. Section A also describes the construction and operation of the filtering logic. Section B describes illustrative methods which explain the operation of the functionality of Section A. Section C describes illustrative computing functionality that can be used to implement any aspect of the features described in Sections A and B.

Figure 21:
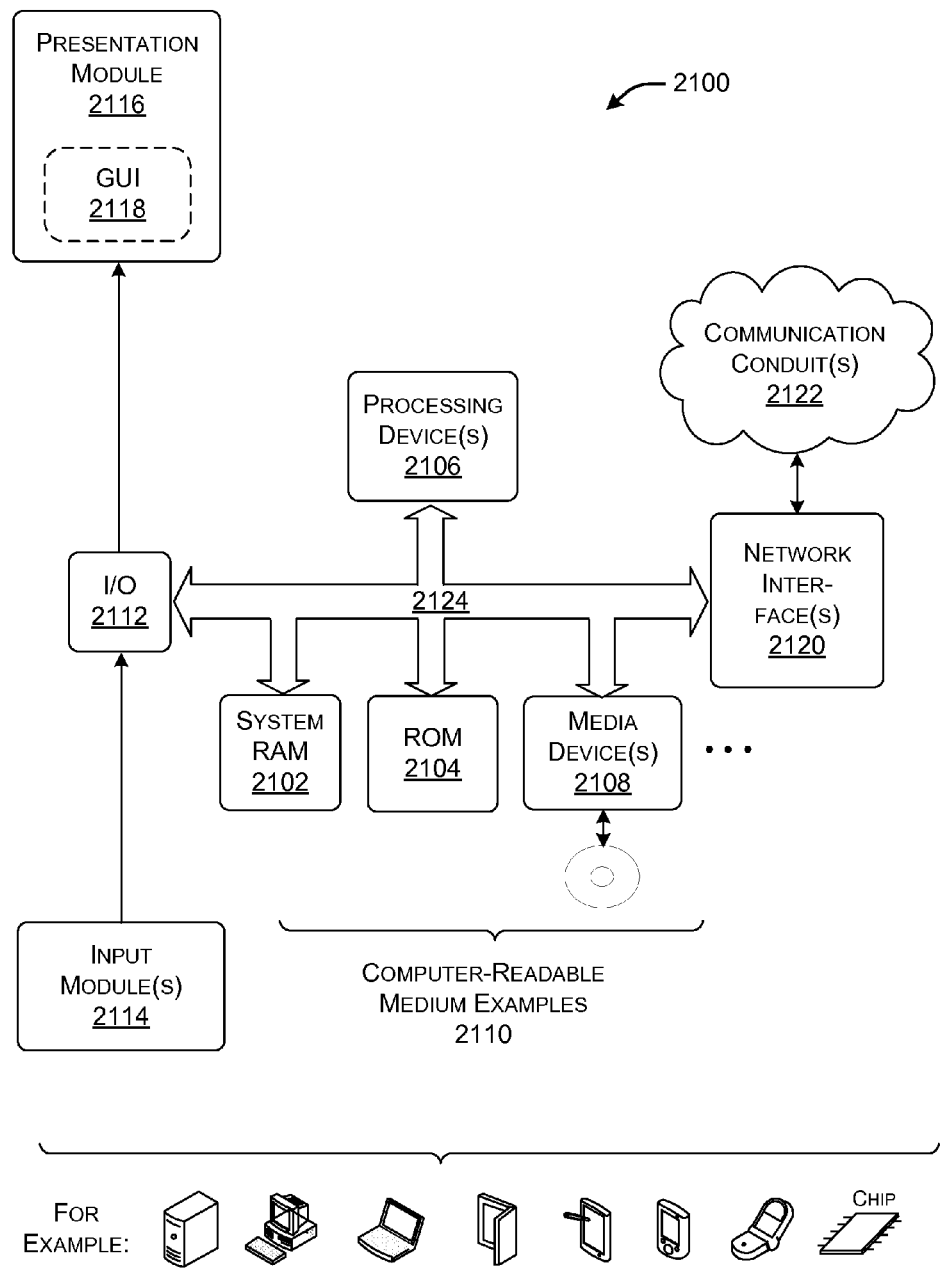
FIG. 21 shows illustrative computing functionality that can be used to implement any aspect of the features shown in the foregoing drawings.

As a preliminary matter, some of the figures describe concepts in the context of one or more structural components, variously referred to as functionality, modules, features, elements, etc. The various components shown in the figures can be implemented in any manner by any physical and tangible mechanisms, for instance, by software, hardware (e.g., chip-implemented logic functionality), firmware, etc., and/or any combination thereof. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. FIG. 21, to be described in turn, provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner by any physical and tangible mechanisms, for instance, by software, hardware (e.g., chip-implemented logic functionality), firmware, etc., and/or any combination thereof.

As to terminology, the phrase "configured to" encompasses any way that any kind of physical and tangible functionality can be constructed to perform an identified operation. The functionality can be configured to perform an operation using, for instance, software, hardware (e.g., chip-implemented logic functionality), firmware, etc., and/or any combination thereof.

The term "logic" encompasses any physical and tangible functionality for performing a task. For instance, each operation illustrated in the flowcharts corresponds to a logic component for performing that operation. An operation can be performed using, for instance, software, hardware (e.g., chip-implemented logic functionality), firmware, etc., and/or any combination thereof. When implemented by a computing system, a logic component represents an electrical component that is a physical part of the computing system, however implemented.

The phrase "means for" in the claims, if used, is intended to invoke the provisions of 35 U.S.C. §112, sixth paragraph. No other language, other than this specific phrase, is intended to invoke the provisions of that portion of the statute.

Figure 1:
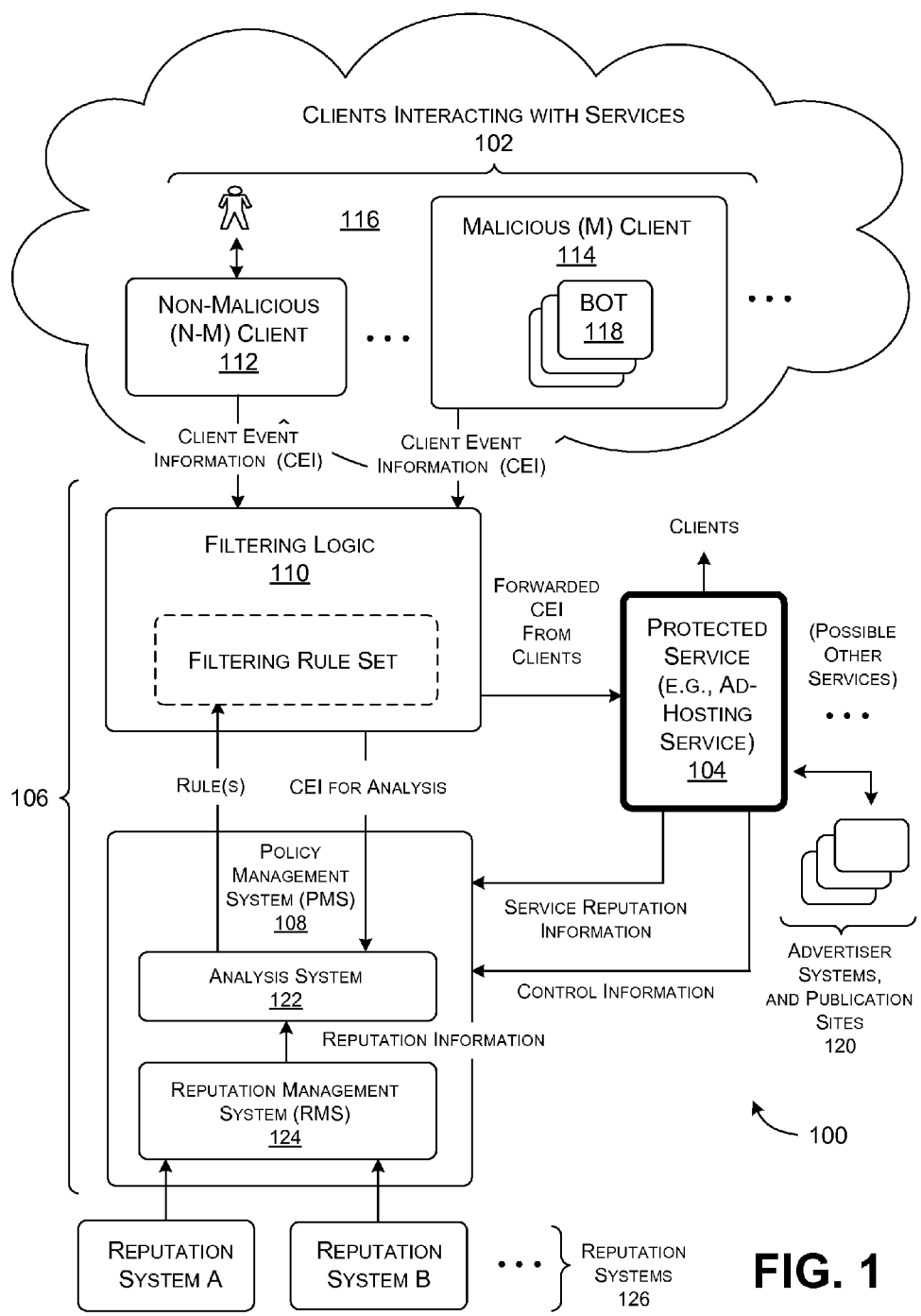
FIG. 1 shows an environment that includes a policy management system and filtering logic. These components operate to provide some benefit to at least one service, such as by protecting the service(s) from malicious clients.

The following explanation may identify one or more features as "optional." This type of statement is not to be interpreted as an exhaustive indication of features that may be considered optional; that is, other features can be considered as optional, although not expressly identified in the text. Finally, the terms "exemplary" or "illustrative" refer to one implementation among potentially many implementations A. Illustrative Mechanisms A.1. Overview of an Environment for Processing Client Event Information FIG. 1 shows an illustrative environment 100 in which a plurality of clients 102 attempt to interact with at least one service 104 of any type. In doing so, the clients 102 send various messages to the service 104. The information imparted by those messages is generically referred to herein as client event information (CEI). A processing system 106 examines the CEI sent by the clients 102 to the service 104 and performs various actions on the CEI. The processing system 106 includes a policy management system 108 and filtering logic 110.

From a high-level perspective, the operations performed by the processing system 106 satisfy one or more policy objectives. In one case, the clients 102 may include any number of non-malicious clients, such as representative non-malicious client 112, and any number of malicious clients, such a representative malicious client 114. The non-malicious client 112 represents any agent that is attempting to perform a legitimate, normal, non-malicious, transaction with the service 104. The malicious client 114 represents any agent that is attempting to perform an action that is deemed undesirable by the service 104 for any reason defined by the service 104; hence, that action may be regarded as malicious. In this context, the processing system 106 performs actions on the CEI sent by the clients 102 with the intent of thwarting the actions by the malicious client 114, but not the non-malicious client 112.

The filtering logic 110 resides anywhere between the clients 102 and the service 104, and for this reason may be regarded as an "in-network" filtering mechanism. By virtue of this configuration, the processing system 106 attempts to take action on the CEI before at least some of the CEI sent by the malicious client 114 reaches the service 104. This has the effect reducing the risk that the service 104 will act on malicious CEI sent by the malicious client 114. This, in turn, eliminates or reduces the amount of post-processing that the service 104 is compelled to perform after having already processed CEI sent by the malicious client 114. As a further benefit, the processing system 106 may reduce congestion in the filtering infrastructure which connects the clients 102 to the service 104, and may potentially simplify the processing performed by the service 104 itself. These potential benefits are cited by way of illustration not limitation; other implementations of the processing system 106 may provide additional advantages.

In other cases, the processing system 106 serves some other policy objective that does not involve discriminating between non-malicious clients and malicious clients. For example, the processing system 106 can classify the CEI into different categories of non-malicious traffic, and take different actions on the traffic depending on its assigned classification. Hence, while many of the examples presented in this disclosure pertain to the management of online threats, the reader should keep in mind that the processing system 106 can be tailored to satisfy any policy objective or objectives.

This subsection presents an overview of the environment 100 as a whole. Later subsections present further details on selected components in the environment 100. Namely, Subsection A.2 presents further illustrative details regarding the filtering logic 110. Subsection A.3 presents further illustrative details regarding the policy management system 108. And subsection A.4 presents further illustrative details regarding the service 104.

Starting at the top of FIG. 1 and working down, each client may correspond to any type of computing device which operates in a network environment 116 of any type. For example, at least some of the clients 102 may correspond to any of: personal computer devices; laptop computer devices; tablet-type computer devices; mobile telephone devices (including smartphone devices); electronic book reader devices; personal digital assistant devices; game console devices; portable game playing devices; set-top boxes; intelligent appliances, and so on. Alternatively, or in addition, some of the clients 102 may correspond to software agents within more encompassing applications or devices.

The network environment 116 may correspond to a wide area network of any type (such as the Internet), a local area network, a point-to-point connection, or combination thereof. The network environment 116 may operate based on any protocol or combination of protocols. FIG. 1 shows that the network environment 116 encompasses only the clients 102 for convenience of illustration, but any other component in FIG. 1 may be considered as "part" of the network environment 116. For example, the service 104 may represent functionality that is accessible to the clients 102 via the Internet, available at a specified IP address.

In some cases, the representative non-malicious client 112 may represent any computer device under the direction of a human user that performs an action assessed by the service 104 as being legitimate. For example, if the service 104 is a shopping-related service, the non-malicious client 112 may represent a computer device that performs a normal shopping transaction under the direction of the human user.

In contrast, the malicious client 114 may include a BOT 118 that performs a malicious action directed at the service 104 in automated fashion. The BOT 118 represents any kind of malicious software and/or hardware that the malicious client 114 acquires in any manner. In the most common cases, the malicious client 114 may acquire the BOT 118 by becoming infected with a virus, e.g., when the user interacts with an infected website, downloads an infected file, etc. More precisely, a malicious client that is infected with a BOT is often infected with multiple BOTs. Indeed, it is often the case that a first-installed BOT may accommodate the introduction of additional BOTs. In other cases, the representative malicious client 114 may represent any non-infected computer device that is nevertheless being operated by a malicious user for any malicious objective.

The malicious client 114 can perform any type of malicious activity. In the prominent example set forth herein, the service 104 is an ad hosting service. In this kind of business environment, an advertiser submits an ad to the ad hosting service. The ad hosting service then presents the ad on any number of publication sites, maintained by respective publishing entities. In a non-malicious mode of operation, a user may click on the ad when viewing a publication site, or otherwise interact with the ad (such as by "mousing over" the ad with a mouse device, etc.). This prompts the non-malicious client 112 to send an instance of CEI to the service 104. Here, the instance of CEI conveys the ad-consumption action taken by the user, such as a click made may the user. In many business models, the user's action is also a revenue-generating event for the publishing site and the ad hosting service. That is, as a result of the user's click, the advertiser is obligated to pay a prescribed fee to the publication site on which the ad is displayed; further, the advertiser is often obligated to pay a typically smaller fee to the ad hosting service itself. In a malicious mode of operation, the BOT 118 of the malicious client 114 may automatically click on the ad posted by a publication site. Although there is no "real" user behind these actions, the advertiser may still incur the various costs described above, unless the ad hosting service recognizes the BOT's clicks as fraudulent.

Different motivations may underlie a click fraud campaign. In some cases, a malicious entity may be affiliated with one or more publication sites. The malicious entity can instruct its army of BOTs to click on these publication sites to generate ad revenue for these sites. In other cases, a malicious entity may be a competitor of a particular advertiser. The malicious entity may instruct its BOTs to click on the advertisements of its competitor, wherever they may appear. This has the effect of depleting the advertising budget of the advertiser, without otherwise directing meaningful customer traffic to the advertiser's ad campaign. In other cases, a malicious entity may orchestrate a click fraud campaign as a form of political or social protest, and so on.

Many other types of malicious attacks are possible. For example, in a distributed denial of service (DDOS) attack, the BOTs send a large number of requests to a service 104. This has the effect of swamping the service 104 with fake traffic, which, in turn, prevents the service 104 from handling legitimate traffic in an efficient manner. In a statistical guessing attack, the BOTs repeatedly attempt to guess the passwords of users of a service, or otherwise attempt to gain unauthorized access to the service. In a traffic-boosting campaign, the BOTs may direct fake traffic to a site for the purpose of boosting the relevance score of the site in a search engine's ranking. These few cases are mentioned by way of example, not limitation. Further, as explained above, in other environments, the processing system 106 may attempt to discriminate between different kinds of non-malicious traffic, rather than separate non-malicious traffic from malicious traffic.

The representative service 104 can perform any activity. In the prominent example set forth herein, the service 104 is an ad hosting service which interacts with one or more advertiser systems and publication sites 120. In other cases, the service may correspond to a shopping-related site, a financial services site, a news-related site, a social network site, and so on. In terms of physical implementation, the service 104 may be implemented as one or more server computers and associated data stores.

Figure 6:
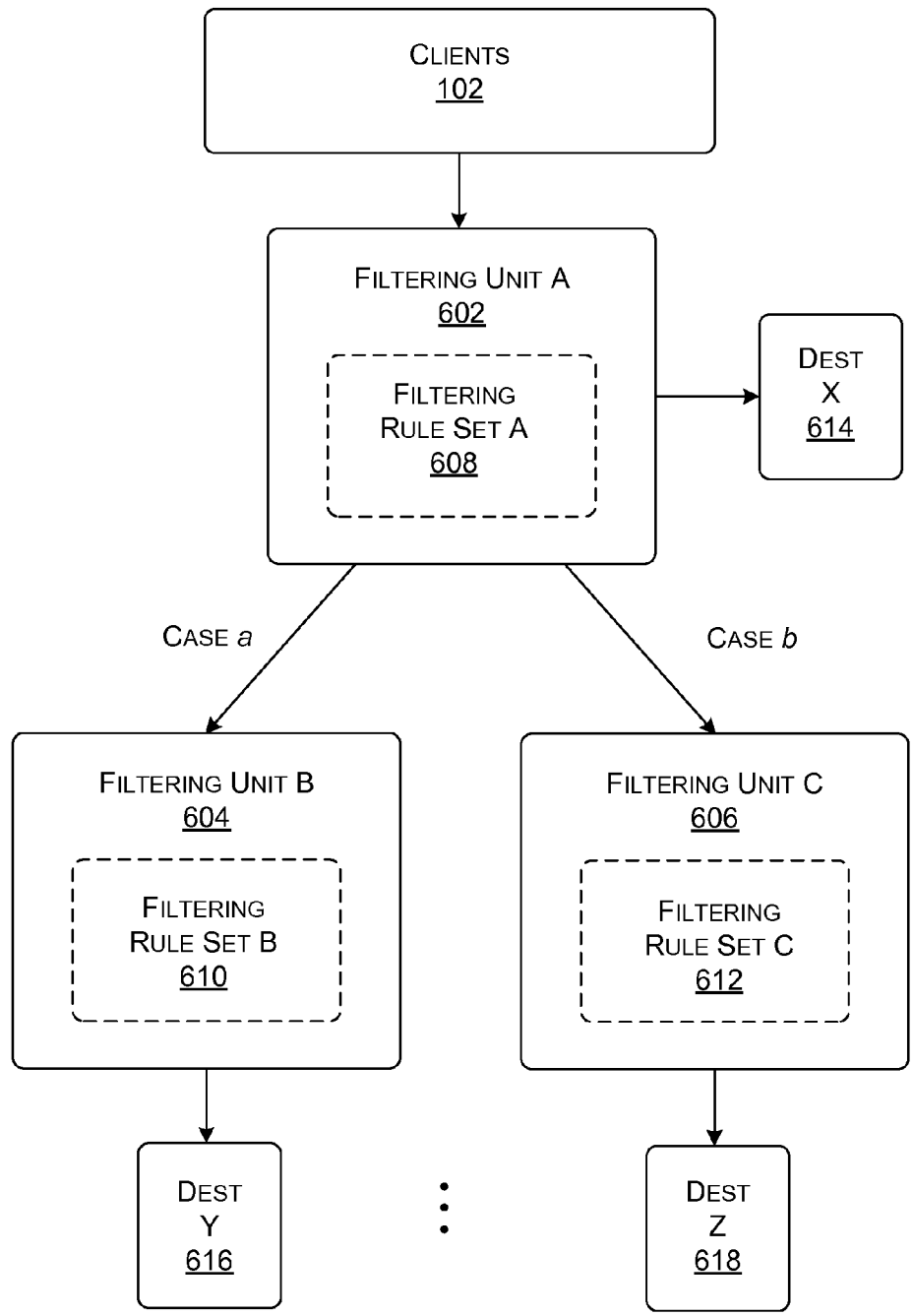

FIG. 1 shows a single service 104 for ease of illustration. But the processing system 106 can filter CEI on behalf of any number of services. For example, in one case, the processing system 106 can act as a guardian to a data center which hosts multiple services. In that context, the processing system 106 can examine and act on CEI directed to any number of the services hosted by the data center. FIG. 6, described below, provides additional details regarding the use of the processing system 106 to protect multiple services.

As mentioned above, the processing system 106 includes filtering logic 110 and policy management system 108. As the name suggests, the filtering logic 110 filters CEI that is sent by the clients 102 to the service 104. In addition, in some implementations, the filtering logic 110 can also filter traffic in the opposite direction, that is, from the service 104 to the clients 102. The filtering logic 110 performs this role by comparing each instance of CEI with the rules in a rule set. Each rule in the rule set is associated with at least one client of interest. For example, a rule may identify one or more malicious clients of interest. Through this process, the filtering logic 110 can identify whether an instance of CEI that it has received originates from a client that is deemed a threat, or potentially a threat.

Upon classifying the instance of CEI, the filtering logic 110 then takes one or more actions on the CEI. For example, the filtering logic 110 can block the instance of the CEI, which prevents the instance of the CEI from reaching any target destination. Alternatively, the filtering logic 110 can reroute the instance of the CEI to a destination which differs from its original destination. In this case, the filtering logic 110 can send the instance of CEI to just the new destination, or can send the instance of CEI to both the original and new destinations. Alternatively, or in addition, the filtering logic 110 can add information to the instance of CEI, which has the effect of tagging or marking the CEI. Any downstream consumer of the instance of CEI can read the tagging information and process the instance accordingly. The filtering logic 110 can perform yet additional operations.

The policy management system 108 generates the rules used by the filtering logic 110. The policy management system 108 then deploys the rules in the filtering logic 110. More specifically, an analysis system 122 generates the rules based on at least two sources of information: a) reputation information received from a reputation management system 124; and b) CEI received from the filtering logic 110 and forwarded to the analysis system 122. Each instance of reputation information describes at least one client of interest that has recently exhibited activity within the network environment 116. In contrast, the forwarded CEI describes CEI that the filtering logic 110 has recently received from at least one client. More specifically, in some cases, the forwarded CEI may correspond to original "raw" CEI that has not been modified by the filtering logic 110. Alternatively, or in addition, the forwarded CEI may correspond to already-processed CEI that includes supplemental information added thereto, compared to the original CEI. For example, the forwarded CEI may include tagging information added by the filtering logic 110.

By virtue of the above-summarized mode of operation, the analysis system 122 will attempt to fashion a rule that targets a malicious client identified in the reputation information, providing that the forwarded CEI also indicates that this same malicious client is also currently attempting to perform a transaction with the service 104 being protected. To be more concrete, the reputation information may indicate that the BOT 118, which operates on malicious client 114, has recently attempted to contact its command and control (C & C) site (for reasons explained in greater detail below). The analysis system 122 determines whether any of the CEI received from the filtering logic 110 indicates that the malicious client 114 is also attempting to click on an ad from the ad hosting service. If so, the analysis system 122 may attempt to fashion a rule that has the intent of blocking this particular malicious client 114, optionally together with other malicious clients which may be associated with the malicious client 114.

More specifically, each instance of CEI is associated with a network connection, which may also be regarded as a transaction or a flow. For example, assume that the malicious client 114 attempts to click on an ad. This action causes the malicious client 114 and service 104 to exchange a series of packets, e.g., in the Transmission Control Protocol (TCP), or some other protocol or combination of protocols. The packets, for instance, may include one or more introductory packets that mark the beginning of the connection (e.g., a SYN packet), one or more packets that send payload data interspersed with acknowledgement packets, and one or more closing packets that mark the close of the connection (e.g., a FIN packet). Each connection of this nature has a duration, extending from the first first-transmitted packet to the last-transmitted packet. The duration may correspond to just a fraction of second in some cases (e.g., 300 ms). In other cases, the duration is longer (e.g., potentially several seconds or minutes, etc.).

In some cases, the analysis system 122 is capable of catching a first-discovered malicious client 114 "in the act" of performing a malicious connection. In this case, the analysis system 122 may be able to formulate a rule that targets the malicious client 114 and deploy that rule onto the filtering logic 110 before the connection has terminated. This may enable the filtering logic 110 to stymie the malicious transaction as whole. This, in turn, prevents the service 104 from acting on the transaction.

Yet, in other cases, the connection is too short to stop the transaction in real time. That is, the analysis system 122 requires a certain amount of time to detect a threat, formulate a rule, and then pass that rule to the filtering logic 110. The filtering logic 110 then takes a certain amount of time to load the new rule in its data store. This latency means that the filtering logic 110 may be unable to act on the new rule while the current client connection is in progress.

To address this latency issue, the analysis system 122 also attempts to predict malicious clients that are likely to interact with the service 104 in the near future, and pushes those rules to the filtering logic 110 on a proactive basis. The manner in which the analysis system 122 performs this task is described in greater detail below. As an overview, the analysis system 122 can first identify a malicious client that is currently active in the network environment 116. Then the analysis system 122 can determine whether the behavior of any other clients is similar to this identified client. Alternatively, or in addition, the analysis system 122 can determine whether the identified client is a member of subnet of clients, where that subnet as a whole has a significant number of malicious clients. In response to either of these determinations, the analysis system 122 can formulate one or more rules which target the complete group of potentially malicious clients. This operation is based on the assumption that any of the related clients may perform malicious transactions in the near future.

In addition, the analysis system 122 can attempt to predict whether an identified client will likely engage in malicious activity based on a host of factors, such as: the frequency at which the client has performed malicious activity in the past; the most recent attempt by the client to perform malicious activity; the durational and inter-event characteristics of connections made by the client, and so on.

The reputation management system 124 operates by collecting reputation information from different reputation systems 126. The reputation management system 124 then formulates the reputation information into a standardized record, referred to here as a reputation data set. As described above, an instance of reputation information identifies at least one client that has exhibited malicious activity in the network environment 116.

Figure 2:
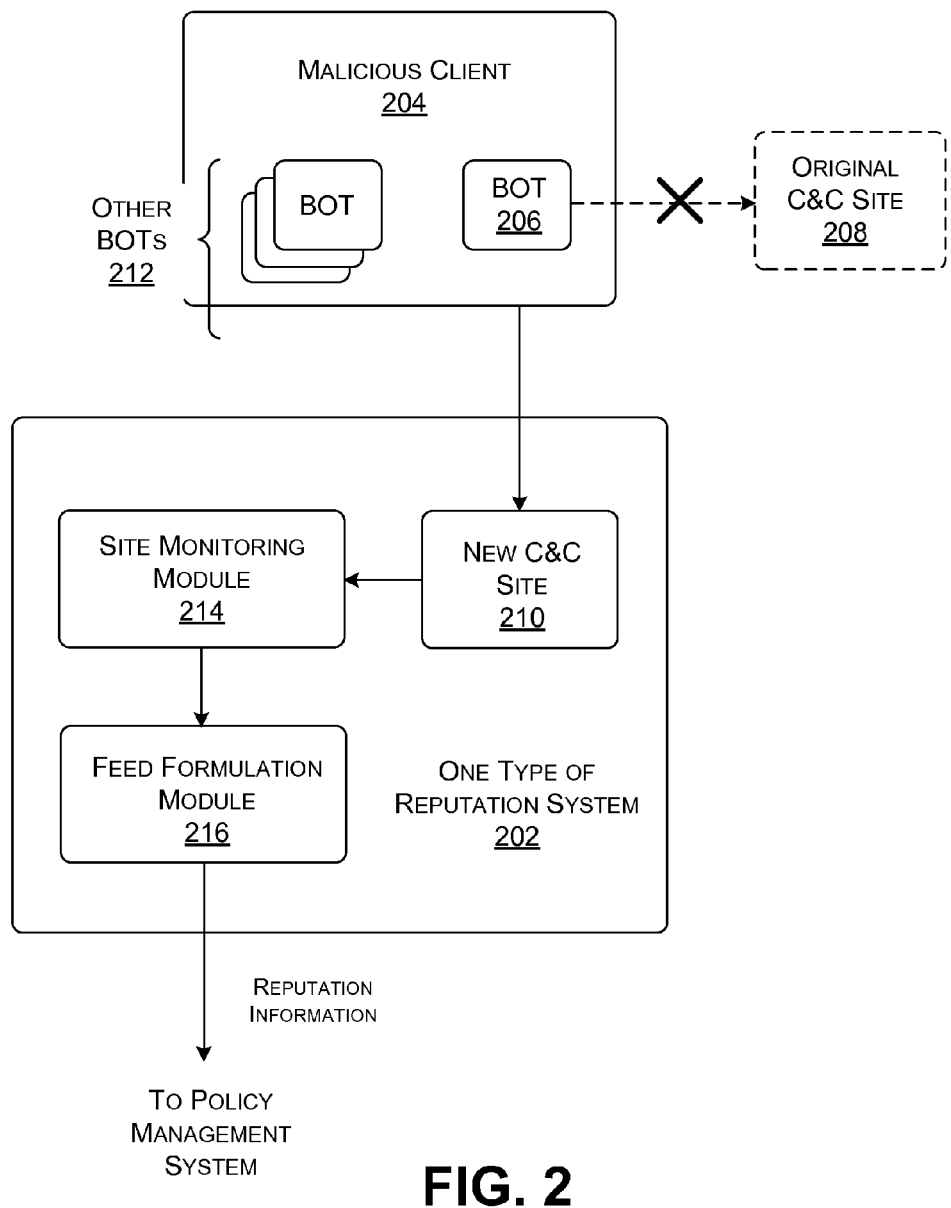
FIG. 2 shows one type of reputation system that provides reputation information to the policy management service of FIG. 1.

Consider, for example, the merely representative reputation system 202 shown in FIG. 2. In some implementations, a malicious client 204 may include a BOT 206 which is programmed to contact an original command and control (C & C) site 208. For example, the BOT 206 may contact the original C & C site 208 on a periodic basis and/or on an event-triggered basis and/or on a random or partially-random basis, etc. The original C & C site 208 may respond to the inquiry from the BOT 206 by providing it with attack instructions. For example, the original C & C site 208 may instruct the BOT 206 to participate in a click fraud campaign that targets a particular website, and/or a particular advertisement, and/or a particular ad hosting service, and so on. The C & C site 208 can re-provision its army of BOTs in this dynamic manner to carry out any malicious objectives.

Further suppose that an entity associated with the reputation system 202 has legally "hijacked" the domain associated with the original C & C site. This means that the BOT 206 will be directed, by a DNS service, to a new C & C site 210, rather than the original C & C site 208. This action may effectively disarm the BOT 206 from causing any damage to the service 104. However, as explained above, a client that includes a single BOT often includes plural BOTs. Hence, the malicious client 204 may still pose a threat to the service 104 by virtue of the existence of other BOTs 212 that may reside on the malicious client 204.

To address the continued risk posed by the malicious client 204, the reputation system 202 includes a site monitoring module 214 that monitors episodes in which any malicious client attempts to contact the new C & C site 210. The reputation system 202 formulates an instance of reputation information in response to this event. A feed formulation module 216 can then forward this instance of reputation information to the reputation management system 124 (of FIG. 1). The reputation management system 124 can then add the received instance of reputation information to its reputation data set.

Each instance of reputation information can include various information items, such as: a) the identity of the malicious client in question; b) temporal information that indicates when the client last performed a suspicious action; c) temporal information that indicates when the client first performed a suspicious action; d) the reputation system from which the instance of reputation information originates, and so on.

Other implementations can employ other types of reputations systems, besides, or in addition to, the reputation system 202 shown in FIG. 2. For example, another reputation system may correspond to a SPAM detector provided by an Email system (not shown). Another reputation system may correspond to a malicious-activity module provided by a search engine, and so on. These reputation systems leverage the principle described above: if a client exhibits one type of malicious behavior, the client may be infected with multiple bad actors, and is therefore considered a potentially active threat. In yet other cases, one or more reputation systems can provide information regarding activity exhibited by non-malicious clients.

Returning to FIG. 1, this figure also indicates that the service 104 can send service reputation information to the policy management system 108. For example, the service 104 may include independent threat analysis functionality. That functionality may conclude that a particular client is a malicious actor. The service 104 can communicate this conclusion to the policy management system 108 as reputation information. Upon receipt, the policy management system 108 can optionally treat this reputation information in the same manner as any other instance of reputation information received from any other reputation system. Alternatively, the policy management system 108 can act on the reputation information provided by the service in a different manner than other instances of reputation information. For example, the policy management system 108 can automatically generate a rule which excludes the malicious client identified by the service 104, rather than weighing the appropriateness of excluding this client in the manner described in detail below.

The service 104 may also issue other control instructions to the policy management system 108. For example, the service 104 may disable and enable the filtering performed by the filtering logic 110, as it pertains to the service 104. In one situation, the service 104 may wish to suspend the protection afforded by the processing system 106 so as to collect statistical data for testing purposes. In this mode, the service 104 may wish to receive both non-malicious and malicious traffic for a limited time span so as to inform itself of threats in the network environment 116 and its ability to handle these threats. After this testing period ends, the service 104 may instruct the policy management system 108 to turn on its protective services. In a similar manner, the service 104 can send any other configuration instructions to the processing system 106 which affects its operation in any manner.

In terms of physical implementation, the filtering logic 110 can be implemented by any number of filtering devices. Subsection A.2 provides additional details on this topic. In one implementation, the analysis system 122, the reputation management system 124, and each reputation system can each be implemented by one or more server computers and associated data stores. Any component shown in FIG. 1, or any combination of components, can be implemented at a single site or distributed over plural sites in any manner.

Further, the components shown in FIG. 1 can be administered by different collections of entities, in accordance with different business paradigms. In one case, a single entity can administer both the filtering logic 110 and the policy management system 108 for the purpose of protecting the service 104. In that case, the service 104 may be administered by the same entity which operates the policy management system 108, or may be administered by a different entity. In this mode, different services may employ their own local version of the policy management system 108. This enables each local version of the policy management system 108 to address the particular needs of the service it is protecting.

In another case, various aspects of the components shown in FIG. 1 can be provided as a common resource that is available to plural services. For example, a single entity can implement a global reputation management system 124 on behalf of one more services and associated local analysis systems. In this case, a local entity which administers a local version of the analysis system 122 can subscribe to the services of the global reputation management system 124. This will enable the local analysis system 122 to receive updated reputation information from the global reputation management system 124 on a periodic, episodic, and/or any other basis, using a push and/or pull model to receive the reputation information. Still other allocations of functions are possible. For example, features of the filtering logic 110 and analysis system 122 that are common to plural services can be shared among those services as a common resource. FIG. 6, for instance, shows an example of filtering logic that serves multiple services (where FIG. 6 is described below).

In another business model, a software developer can produce a software product that may interact with an existing online service, or that may operate as an online service in its own right. In either case, the software developer can design the product such that it integrates with and leverages the protective services of the processing system 106.

In yet another business model, a service can offer the protection of the processing system 106 to its proven non-malicious consumers as an optional feature to be turned on and off upon the instruction of those consumers. The service can charge a fee for such protection, or offer such protection for free.

A.2. Illustrative Filtering Logic

Figure 3:
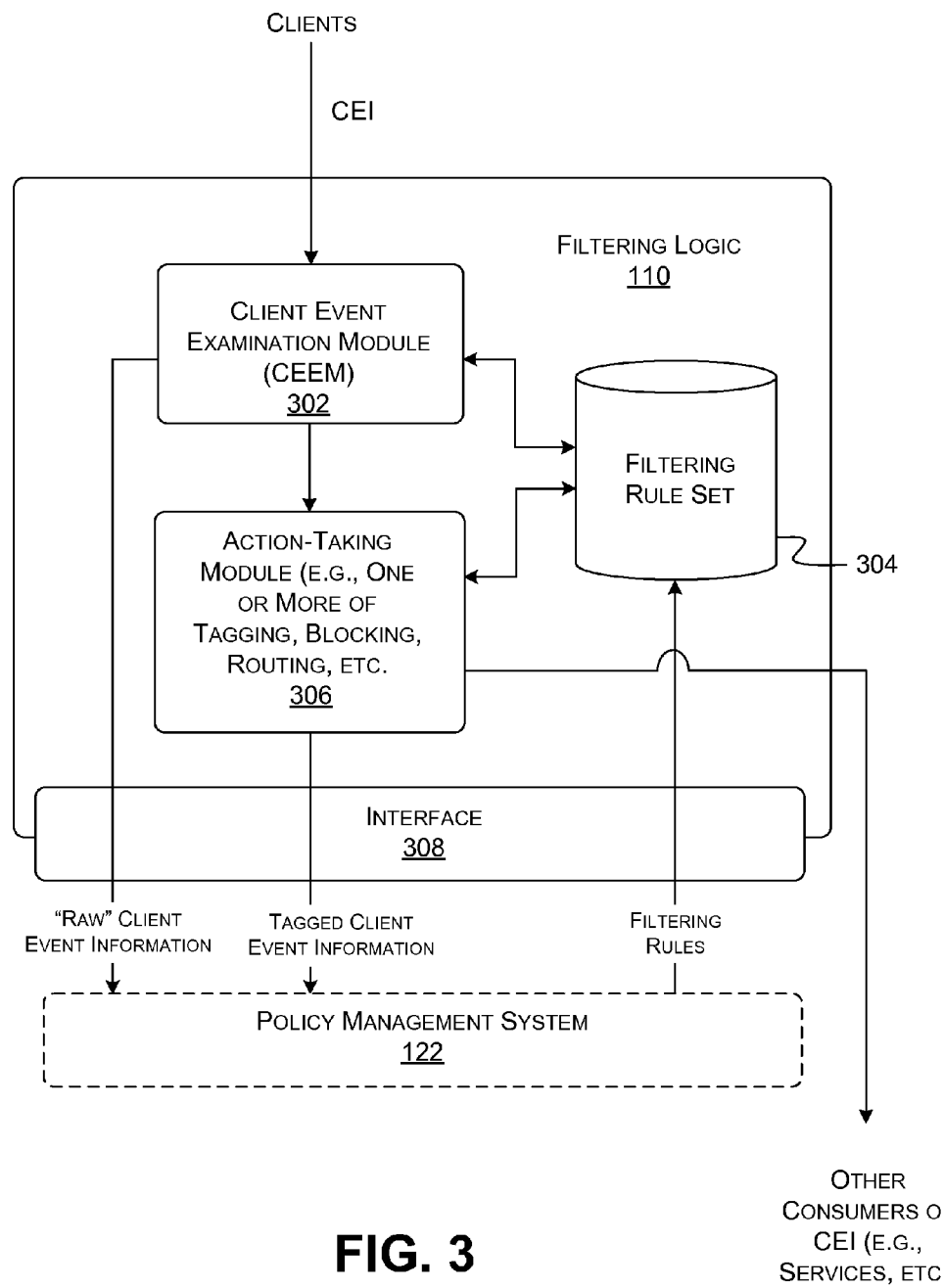
FIG. 3 shows a logical overview of the filtering logic of FIG. 1.

FIG. 3 shows a logical depiction of the filtering logic 110 of FIG. 1. The filtering logic 110 includes a client event examination module (CEEM) 302 for investigating CEI based on rules provided in a data store 304. As set forth in Subsection A.1, in one implementation, each instance of the CEI comprises one or more packets expressed in any network protocol or combination of protocols. The CEEM 302 extracts selected information from identified fields in each packet, and then compares the selected information with corresponding information specified in the rules. For example, the CEEM 302 can extract a source identifier associated with the client which has transmitted an instance of CEI, which is provided in a predefined field of each packet sent by the client. The CEEM 302 can then compare the extracted source identifier with client-of-interest information expressed in the rules. If there is a match, then the CEEM 302 determines that the instance of CEI in question has been transmitted by a client of interest, such as a malicious client. The packets can identify entities in any manner, such as by IP address, Autonomous System Number (ASN) information, etc.

The CEEM 302 can also extract any other selected information items from the CEI, and compare this selected information with corresponding information expressed in the rules. For example, the CEEM 302 can optionally extract a destination identifier associated with the destination of each packet, which may identify the service to the packet is directed. The CEEM 302 can determine that an instance of CEI matches a particular rule if the extracted source identifier and destination identifier match a client of interest and a service specified in a rule, respectively.

An action-taking module 306 performs one or more actions based on the results of the extracting and matching performed by the CEEM 302. As described above, without limitation, possible actions include: a) blocking further propagation of an instance of CEI that matches a rule; b) rerouting an instance of CEI that matches a rule; c) tagging an instance of CEI that matches a rule, and so on. If the instance of CEI does not match any rule, the action-taking module 306 can optionally pass it to its intended destination without modification. In addition, the action-taking module 306 can add tagging information to such an instance of CEI.

More specifically, in some implementations, the CEEM 302 (or the action-taking module 306) can categorize an instance of CEI as white, gray, or black. A white instance of CEI corresponds to CEI that has been judged to be non-malicious. A black instance of CEI is CEI that has been judged to be malicious. A gray instance of CEI is CEI that has been judged to be potentially malicious, but not with the same certainty as the black classification. The action-taking module 306 can then optionally add tag information to each instance of CEI which conveys the white-gray-black classification. In addition, the action-taking module 306 can route white, gray, and black traffic to respective destinations. This implementation is merely one example; other implementations can adopt other classificatory breakdowns of potential client traffic, and/or can perform other actions upon classifying instances of CEI.

In addition to white-gray-black tagging, the action-taking module 306 can add other information to instances of CEI. For example, the action-taking module 306 can embed information into an instance of CEI which indicates the reputation source which has identified the client in question as malicious.

The filtering logic 110 interacts with the policy management system via an interface 308, such as an application programming interface (API). In one interaction, the analysis system 122 sends one or more rules to the filtering logic 110, for storage in the data store 304. In another interaction, the filtering logic 110 sends CEI to the analysis system 122. As will be described in detail below, the analysis system 122 uses this forwarded CEI, together with the reputation information provided by the reputation management system 124, to produce new rules.

As described in Subsection A.1, the filtering logic 110 can send raw original CEI to the analysis system 122. The filtering logic 110 can produce this raw original CEI by forking off a stream of the CEI which it has received from the clients 102. In addition, or alternatively, the filtering logic 110 can send CEI that has already been processed by the action-taking module 306 to the analysis system 122. For example, the processed CEI that is forwarded may include tag information added by the action-taking module 306.

In other cases, the analysis system 122 can consume different types of CEI over the course of its operation. For example, when the analysis system 122 starts up, it may have no information regarding threats in the network environment 116. Correspondingly, the filtering logic 110 may store no rules. In this case, the analysis system 122 may initially ask the filtering logic 110 to send a forked-off copy of the received event stream, without tagging information applied thereto. In short order, the filtering logic 110 will acquire rules and begin processing CEI based on those rules. In view thereof, at some stage, the analysis system 122 may ask for and receive CEI from the filtering logic 110 that contains tagging information, in addition to the raw untagged CEI, or instead of the raw untagged CEI. Still other environment-specific implementations of this feedback mechanism are possible.

In some implementations, the filtering logic 110 represents equipment that resides on the "edge" of a processing domain that contains the service 104. For example, the service 104 may be implemented by a data center, an enterprise environment, or the like. In this context, the filtering logic 110 intercepts CEI that is destined for the service 104 and checks it to determine whether it is malicious in nature.

Figure 4:
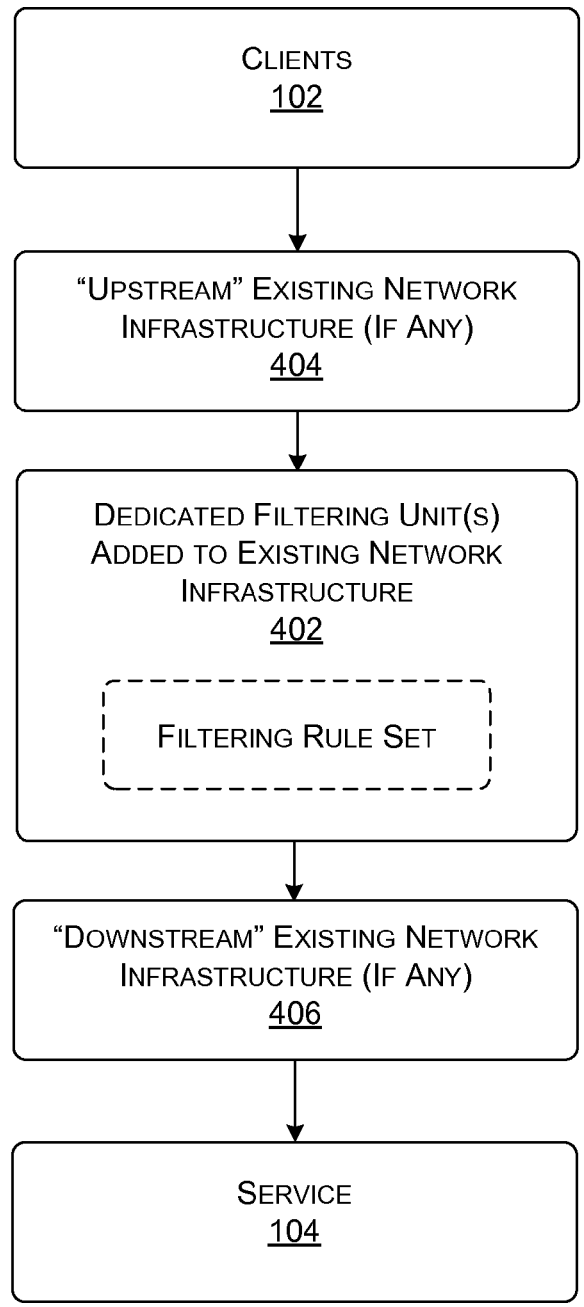
FIGS. 4-6 show three illustrative implementations of the filtering logic of FIG. 3.

More specifically, FIG. 4 shows a first implementation of logical functions of the filtering logic 110 shown in FIG. 3. In this implementation, the filtering logic 110 is implemented as one or more discrete filtering units 402 that are dedicated to performing only the functions shown in FIG. 3. This implementation adds the filtering unit(s) 402 to existing network infrastructure which may perform other network operations on the CEI that may be unrelated to the operations shown in FIG. 3. For example, the existing network infrastructure may comprise any of load balancers, firewalls, core switches, top-of-rack (TOR) switches, aggregate switches, virtual switches, and so on.

More specifically, the filtering unit(s) 402 may sit between upstream existing network infrastructure 404 (if any) and downstream existing network infrastructure 406 (if any). In this configuration, the filtering unit(s) 402 may process the output of upstream existing network infrastructure 404, if any. In addition, or alternatively, the filtering unit(s) 402 may send its output to any downstream existing network infrastructure 406.

Figure 5:
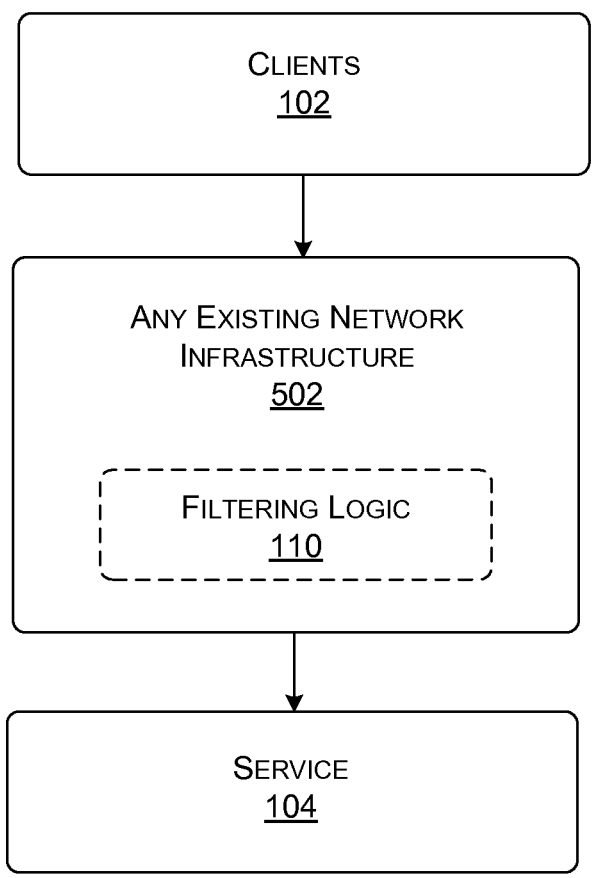

FIG. 5 represents a case in which the operations associated with the filtering logic 110 are incorporated into any piece of equipment that forms a part of the existing network infrastructure 502. Hence, in this implementation, the existing network infrastructure 502 performs the operations set forth in the context of FIG. 3, together with other operations that may be unrelated to the operations of FIG. 3. This yields "smart" network infrastructure. To cite merely one example, at least part of the existing network infrastructure 502 may correspond to one or more TOR switches in a data center. These TOR switches perform their conventional function of directing traffic to appropriate racks of servers. In addition, the TOR switches can be configured to perform at least part of the operations shown in FIG. 3.

In yet other cases, the implementations of FIGS. 4 and 5 can be combined into a single implementation. That is, this combined implementation would include one or more discrete single-purpose filtering units, as in FIG. 4, with the kind of dual-purpose functionality shown in FIG. 5. Still other implementations are possible.

FIG. 6 shows one implementation of the filtering logic 110 that comprises plural filtering units (602, 604, 606) arranged in a hierarchy. (It should be noted, however, that FIG. 6 represents merely an illustrative example; other implementations can include hierarchies having any number of levels, filtering units, branches, etc.). Filtering unit A 602 maintains rule set A 608, filtering unit B 604 maintains rule set B 610, and filtering unit C 606 maintains rule set C 612. Each of these rule sets includes a different subset of rules compared to the other rule sets. Each filtering unit (602, 604, 606) can be implemented as a discrete single-purpose filtering unit (as shown in FIG. 4) or multi-purpose filtering functionality (as shown in FIG. 5).

In general, the filtering unit A 602 determines whether an instance of CEI meets a prescribed test (as governed by rule set A); if so, the filtering unit A 602 can forward the CEI to destination X 614 and/or perform some other action(s) on the instance of CEI. If the instance of CEI does not satisfy the test imposed by filtering unit A 602, the filtering unit A 602 may classify it as belonging to one of two cases: case a or case b. If the instance CEI is assigned the first class, the filtering unit A 602 forwards it to filtering unit B 604. If the instance of CEI is assigned to the second class, the filtering unit A 602 forwards it to the filtering unit C 606. The filtering unit B 604 can then perform its own local test (as guided by rule set B 610) to determine whether to forward the CEI to destination Y 616 and/or perform some other action(s) on the instance of the CEI. The filtering unit C 606 likewise can perform its own local test (as guided by rule set C 612) to determine whether to forward the CEI to destination Z 618 and/or perform some other action(s) on the instance of the CEI. The destinations 614, 616, and 618 may be associated with any of services, analysis sites, "sink hole" sites (in which the CEI is essentially discarded), and so on.

In one case, the hierarchical structure of FIG. 6 can be used to protect plural services within a data center or other environment. A top level filtering unit (e.g., filtering unit A 602) can determine whether an instance of CEI originates from a client that is deemed malicious with respect to all services hosted by the environment. If so, the filtering unit A 602 can block the instance of CEI, or send it to an analysis site associated with destination X 614. Filtering unit B 604 can then perform filtering that is locally appropriate to a service which it protects (associated with destination Y 616), and filtering unit C 606 can perform filtering that is locally appropriate to the service which it protects (associated with destination Z 618), and so on.

In another case, all three of the filtering units (602, 604, 606) shown in FIG. 6 protect a single service. The top-level filtering unit A 602 can perform relatively coarse-level filtering on behalf of the single service. The other filtering units (604, 606) can perform finer-grade filtering for the service. For example, filtering unit A 602 can be assigned the task of classifying an instance of CEI as white, gray, or black. Filtering unit B 604 and/or filtering unit C 606 can be assigned the more refined task of analyzing traffic classified as gray. This architecture is also a way to increase the number of rules that the filtering logic 110 can accommodate, compared to the use of a single filtering unit having a fixed memory capacity. To repeat, these examples are presented by way of illustration, not limitation; still other applications of hierarchical filtering structures are possible.

A.3. Illustrative Policy Management System

Figure 7:
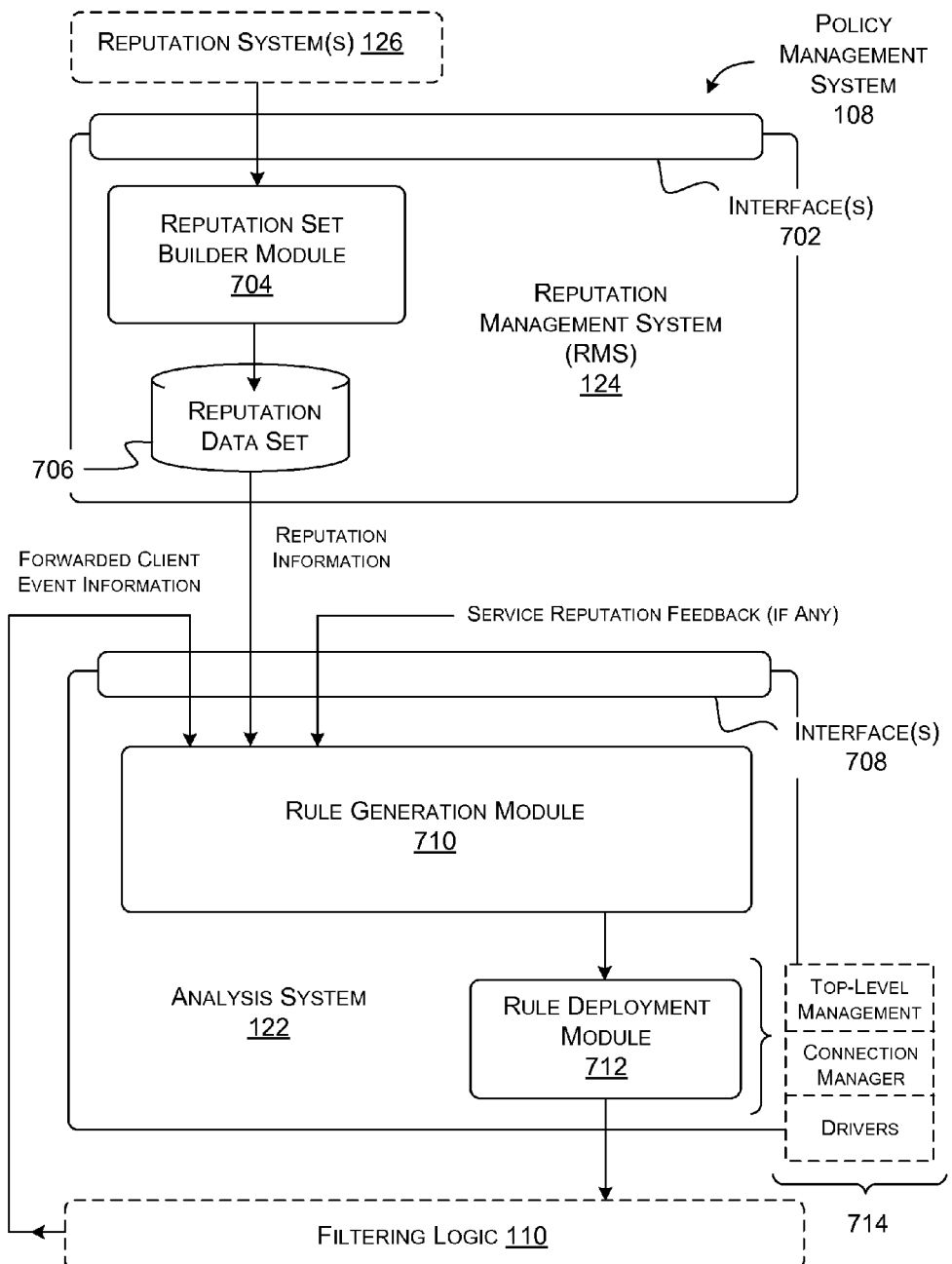
FIG. 7 is a more detailed depiction of the policy management system of FIG. 1. The policy management system includes a reputation management system and an analysis system.

FIG. 7 shows additional illustrative detail regarding the policy management system 108, introduced in the context of FIG. 1. As set forth above, the policy management system 108 includes the reputation management system 124 and the analysis system 122. These two systems (122 and 124) can be implemented by the same or different server computers. Further, these two systems (122 and 124) can be administered by the same entity or by different respective entities.

The reputation management system 124 includes an interface 702, such as an application programming interface (API), for receiving reputation information from the reputations systems 126. Each reputation system can interact with the reputation management system 124 via the interface 702 to perform various operations. For example, each reputation system can register itself as a reputation feed. Each reputation system is thereafter associated with an identifier, which it provides to the reputation management system 124. Each reputation system can then send instances of reputation information to the reputation management system 124 each time it detects predefined suspicious behavior in the network environment 116 (such as a client checking into a captured C & C site). More specifically, the reputation management system 124 can collect the reputation information from each reputation system on a push basis, a pull basis, and/or any other basis. Each reputation system can identify the client of interest by IP address, ASN, and/or any other designator. Each reputation system can also identify an entire subnet by specifying an identified mask, such as by specifying the prefix associated with the subnet (to be described in greater detail below).

A reputation set builder module 704 compiles a reputation data set based on the instances of reputation information that it receives from different reputation systems 126. The reputation set builder module 704 stores the reputation data set in a data store 706. More specifically, the reputation set builder module 704 can store the reputation data set as a file in any format (such as SQL). The reputation set builder module 704 can also maintain a version of the reputation data set in memory to facilitate quick lookup. The reputation set builder module 704 can structure the reputation data set as a hash table, or in some other data structure.

The analysis system 122 includes an interface 708, such as an API, for interacting with various other entities. For example, the interface 708 receives reputation information from the reputation management system 124, forwarded CEI from the filtering logic 110, service reputation information from the service 104, etc. This information may be received on a push basis, a pull basis, and/or any other basis. A rule generation module 710 operates on the received information to produce rules using any mechanism. In one case, the rule generation module 710 uses an algorithm that employs a cost function, as will be set forth in greater detail below. In another case, the rule generation module 710 employs artificial intelligence engine, such as a machine learning engine, a neural network engine, etc.

A rule deployment module 712 sends the rules generated by the rule generation module 710 to the filtering logic 110. The rule deployment module 712 can perform this task using different levels of functionality 714. For example, a lowest level of the functionality 714 can correspond to one or more drivers. The drivers perform discovery to identify the filtering units that are operational in the filtering logic 110 at any given time. The drivers also convert the rules to be pushed to the filtering logic 110 to a format that is compatible with each recipient filtering unit. The connection manager determines the manner in which the rules are parsed out to the different filtering units in the filtering logic 110. The top-level management layer maintains information regarding the expected topology of the filtering logic 110. The top-level management layer also maintains policies which determine how rules are disseminated to the different filtering units. The top-level management layer can also define a course of action to be taken when at least some of the filtering units that are expected to be present in the filtering logic 110 are not found by the drivers. Other implementations of the rule deployment module 712 can adopt other device control architectures and paradigms.

Figure 8:
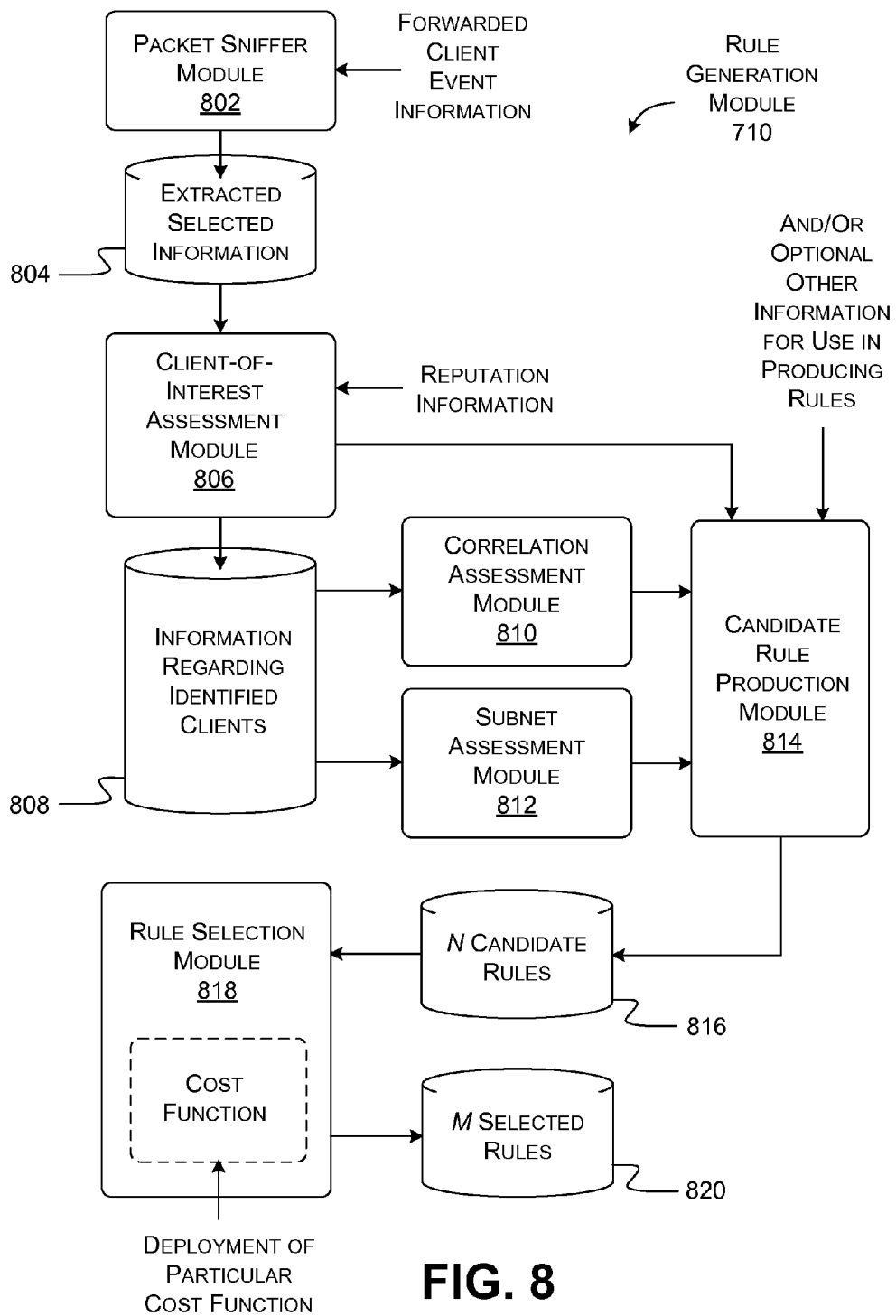
FIG. 8 shows a rule generation module, which is a component of the analysis system shown in FIG. 7.

FIG. 8 shows one implementation of the rule generation module 710 of FIG. 7. This implementation is set forth by way of example, not limitation. Other implementations can adopt any other type of analysis architecture and algorithmic processing.

The rule generation module 710 includes a packet sniffer module 802 for examining packets associated with the forwarded CEI, provided by filtering logic 110. As explained above, the forwarded CEI may or may not include additional information added by the filtering logic 110, such as tagging information. The packet sniffer module 802 operates by extracting selected information from predefined fields of packets, and storing the selected information in a data store 804. In one implementation, the selected information may identify the client which has sent each packet, the service to which the packet is directed, and the source and destination ports associated with the client and service, respectively.

A client-of-interest assessment module 806 compares the extracted selected information with the reputation information. In one case, this comparison may involve, for each instance of CEI, comparing a client identifier that has been extracted from the CEI with the known malicious clients identified in the reputation information. If there is a match, the client-of-interest assessment module 806 can store information regarding a potentially malicious client in a data store 808. This is a client that: a) has been identified as malicious by at least one reputation system; and b) has recently attempted to perform a transaction with the service 104. Each client that is identified in the data store 808 is referred to herein as an identified client.

A correlation assessment module 810 and a subnet assessment module 812 attempt to find clients that are related to each identified client in the data store 808. More specifically, the correlation assessment module 810 compares the behavior of each identified client with the behavior of other clients. As a result of this comparison, the correlation assessment module 810 may find that one or more other clients perform a similar pattern of clicks as an identified client under consideration. Different factors may explain this similarity. In some cases, a BOT may embody logic which produces similar behavior in different clients which are infected with this same BOT. Alternatively, or in addition, a client that is infected with the BOT may be associated with a group of IP addresses; the clients that are associated with these IP addresses therefore may produce the same pattern of behavior.

The subnet assessment module 812 determines the subnet to which each identified client belongs (where the concept of a subnet is clarified below). If the subnet is populated with a significant number of other malicious clients, the subnet assessment module 812 can store the prefix of that subnet. The subnet assessment module 812 can also determine a subnet for each correlated client identified by the correlation assessment module 810.

Both the correlation assess module 810 and the subset assessment module 812 promote one of the overriding goals of the analysis system 122, which is to predict malicious clients which are likely to be active in the network environment 116 in the near future. This is useful because, as explained above, the processing system 106 may have insufficient time to devise and deploy a rule so as to thwart a malicious client that is currently performing a malicious transaction.

Next, a candidate rule production module 814 produces rules which attempt to target the respective identified clients in the data store 808. In addition, the rule generation module 710 can also produce rules which attempt to target the related clients (if any) identified by the correlation assessment module 810 and/or the subnet assessment module 812. For instance, the candidate rule production module 814 can target a whole subnet of clients by adopting a rule which specifies a mask; that mask identifies the subnet.

As a result of its operation, the candidate rule production module 814 can store a set of N candidate rules in a data store 816. The candidate rule production module 814 can structure the rules in any manner. Further, each rule can include various information items, such as, but not limited to: a) the identity of the targeted client in question, such as by providing an IP address, ASN, etc. of the targeted client; b) a mask which identifies a group of other malicious clients with which the targeted client is associated; c) hard time-out information which indicates the amount of time for which the rule will be active; d) idle time-out information which indicates the amount of time for which the rule will be active if no specified event occurs, such as no further reputation information is received for the targeted client in question, and/or no CEI is received from this client, etc.; e) a priority level associated with the rule; f) a description of the reputation source that is responsible for judging the targeted client as being malicious; g) the action or actions to be performed when an incoming instance of CEI is determined to match the rule; h) a measure which defines an extent to which an action specified by the rule is to be performed (e.g., by specifying that X percent of traffic matching the rule is to be permitted through the filtering logic 110), and so on.

More specifically, a first type of rule attempts to target a single malicious client. In one standard and protocol, such a rule identifies the client using a /32 match (where "32" indicates the number of bits in the IP prefix). A second type of rule attempts to target a grouping of clients by specifying a mask. For example, in one case, such a rule can identify a subnet having 255 potential clients using a /24 match (where "24" indicates the number of bits in the IP prefix).

The candidate rule production module 814 can also receive other instructions from any other source. These instructions may play a part in its formulation of rules. For example, the service 104 may instruct the candidate rule production module 814 to ban one or more malicious clients which it has independently assessed as being undesirable. Or a service 104 may instruct the candidate rule production module 814 to change any parameter of an existing rule, such as the priority level of a rule, and/or the throughput percentage associated with the rule, and so on. More generally, any entity, including an administrator, can manually load any rules into the data store 816, delete any rules, modify any existing rules, retrieve any rules for analysis, perform any algorithmic overrides, and so on.

In addition, or alternatively, the rule generation module 710 can record hit counts which reflect a number of times that one or more reputation systems have identified each client as being malicious, e.g., based on the number of times that each client has checked into its C & C domain within a prescribed period, and/or based on the number of times that a service has notified the policy management system 108 that each client is malicious, etc. The candidate rule production module 814 can then boost the priority levels of rules that target clients with relatively high hit counts.

In addition, the rule generation module 710 can detect whether the CEI exhibits potentially malicious behavior when considered by itself, that is, without consideration of the reputation information. The rule generation module 710 can then generate rules when that behavior is detected. For instance, the rule generation module 710 can generate a rule that targets a client when the CEI that is sent by that client exceeds a prescribed threshold, irrespective of whether the reputation information identifies the client as being potentially malicious. This behavior may indicate that the client is participating in a distributed denial of service attack. The rule generation module 710 can generate other rules upon detecting other types of telltale patterns in the CEI.

A rule selection module 818 sorts the rules in the data store 816. More specifically, in some implementations, the filtering logic 110 may have a limited capacity to store a maximum of M entries. Recall that the candidate rule production module 814 produces N candidate rules in the data store 816. If M<N, this means that the filtering logic 110 cannot accommodate the storage and processing of all of the rules in the data store 816. For this reason, the rule selection module 818 ranks the candidate rules in the data store 816 in order of desirability, and then picks out the M top-ranked rules for storage in a data store 820. The rule deployment module 712 (of FIG. 7) then loads these M rules into the filtering logic 110. In other cases, the filtering logic 110 incorporates a very large store for storing the rules. Furthermore, the filtering logic 110 is capable of loading and processing these rules in a suitably expeditious manner. In this case, the rule generation module 710 can load all N rules in the memory of the filtering logic 110, and the rule generation module 710 can therefore omit the operations performed by the rule selection module 818.

Section B provides illustrative details regarding one manner of operation of the rule selection module 818. By way of overview, the rule selection module 818 can employ at least one cost function to sort the N rules in the data store 816.

Figure 9:
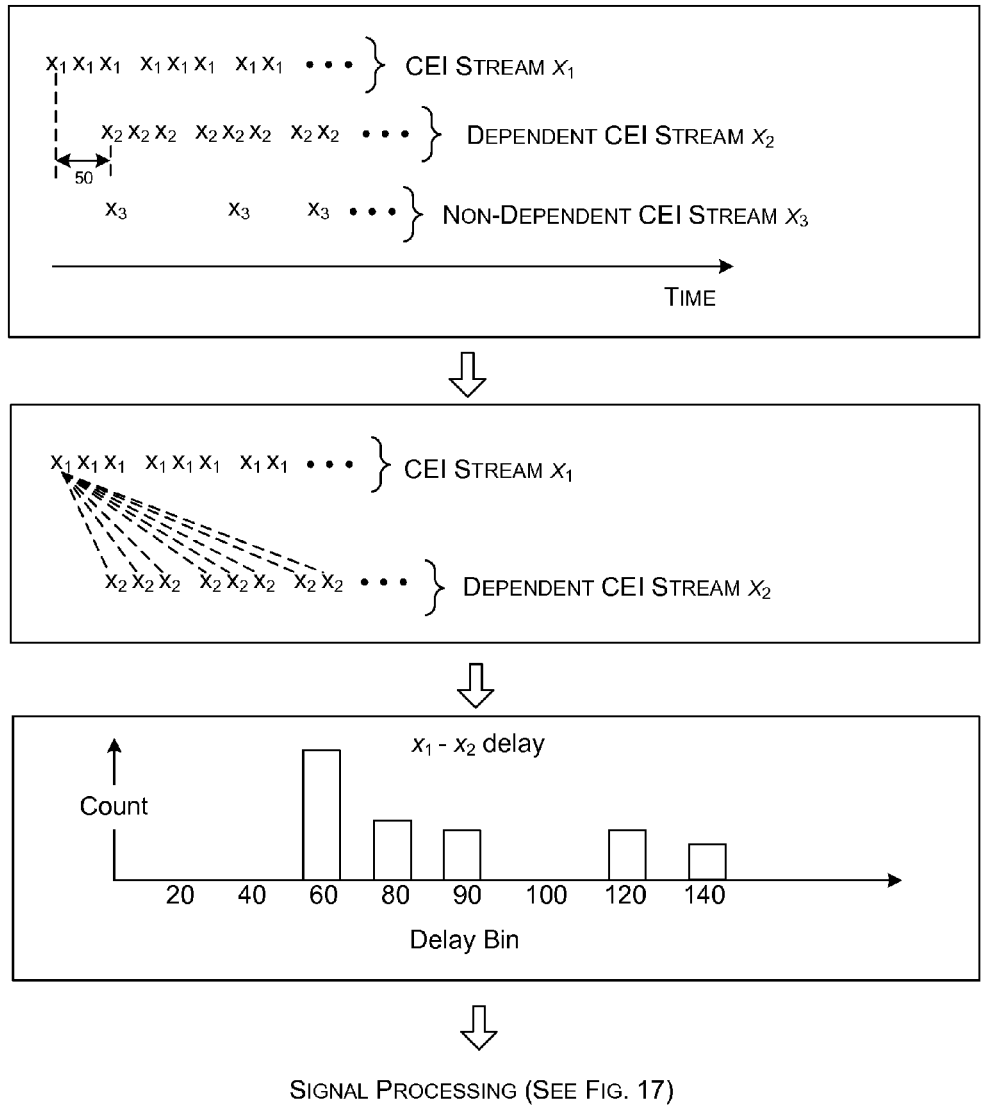
FIG. 9 shows an implementation of an illustrative service shown in FIG. 1.

FIG. 9 pictorially describes the operation of the correlation assessment module 810 of FIG. 8. As indicated in the topmost panel, a CEI stream $x_1$ corresponds to a series of instances of CEI sent by a first client, where that first client is known to be malicious. In the terminology set forth above, the first client corresponds to an identified client detected by the client-of-interest assessment module 806. The correlation assessment module 810 compares the CEI stream $x_1$ with the CEI stream of every other client, with the objective of finding other CEI streams (if any) which exhibit similar behavior to the CEI stream $x_1$. For instance, the top-most panel shows that the CEI stream $x_2$ for a second client appears to exhibit the same pattern of clicks as the CEI stream $x_1$; but the CEI stream $x_2$ is temporally displaced from the CEI stream $x_1$, e.g., by about 50 ms (although much longer displacements are also possible). Two clients may exhibit similar behavior for any number of reasons set forth above. On the other hand, the CEI stream $x_3$ produced by a third client appears to exhibit a random pattern that does not match the pattern of CEI stream $x_1$.

The middle panel indicates the manner by which the correlation assessment module 810 can compare two CEI steams of CEI. Namely, the correlation assessment module 810 can compute and store the delay between each instance of CEI in a first CEI stream with each instance of CEI in a second CEI stream.

As indicated in the third panel, the correlation assessment module 810 can then sort the computed delays into the temporal bins of a histogram, where each bin corresponds to a specified delay period. The correlation assessment module 810 can then perform processing to remove noise from the signal represented by the histogram. The manner in which this processing can be performed is described in Section B. After such processing, the correlation assessment module 810 can determine if there are any spikes in the processed signal. Spikes having a significant magnitude indicate that the two CEI streams under consideration are correlated.

Figure 10:
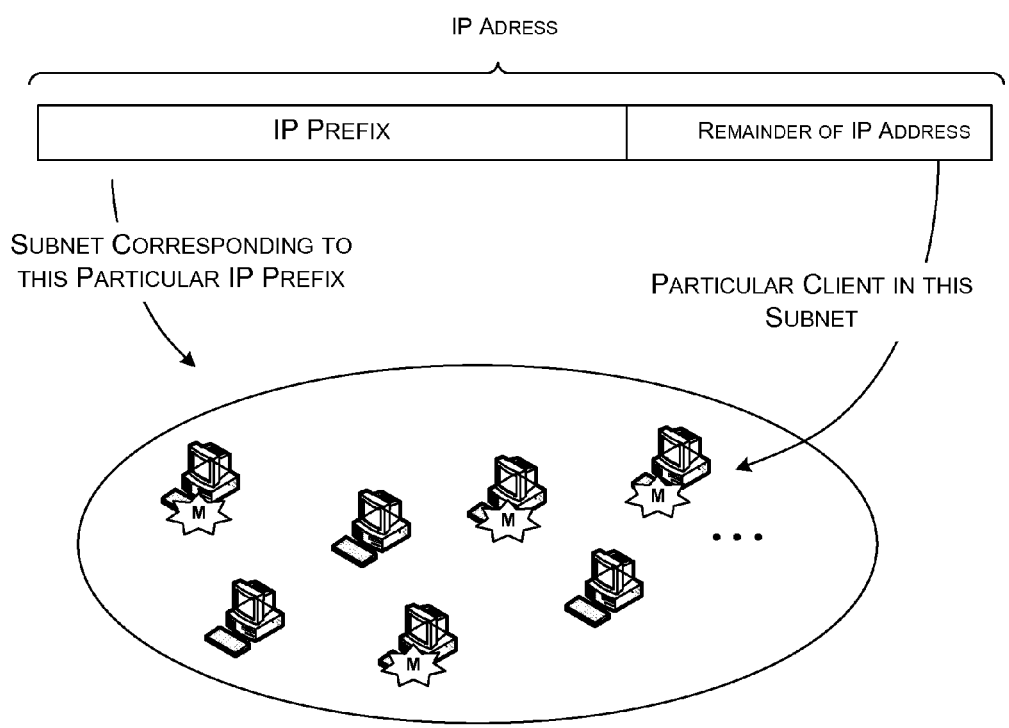
FIG. 10 shows a message that the service, of FIG. 9, may present to a client, notifying the client that it may be infected with a BOT.

FIG. 10 pictorially describes the operation of the subnet assessment module 812 of FIG. 8. By way of introduction, an IP address may be regarded as a collection of bits including a prefix and a remaining set of bits. The group of IP addresses which share the same prefix corresponds to a subnet. That is, each client in the subnet has the same IP prefix, but a different remaining address portion. In any subnet, zero, one, or more clients may be infected with a malicious agent.

In one manner of operation, the subnet assessment module 812 identifies the subnet (or subnets) to which an identified client belongs. The subnet assessment module 812 then determines the number of infected clients in this group relative to the total number of clients in this group. The subnet assessment module 812 then makes a determination, based on this ratio, whether it is appropriate to fashion a rule which targets the entire subnet. A subnet having a percentage of bad agents that exceeds a prescribed threshold is an appropriate candidate to target as a whole.

Consider, for example, the IP prefix 128:10:12, with a /24 subnet. The destination "/24" means that the IP prefix has 24 bits. The subnet can accommodate a total of 255 clients, meaning that the last 8 bits of the address can accommodate 255 permutations. If 20 clients in this subnet happen to be malicious, then the score for this subnet is 20/255.

A.4. Illustrative Service

Figure 11:
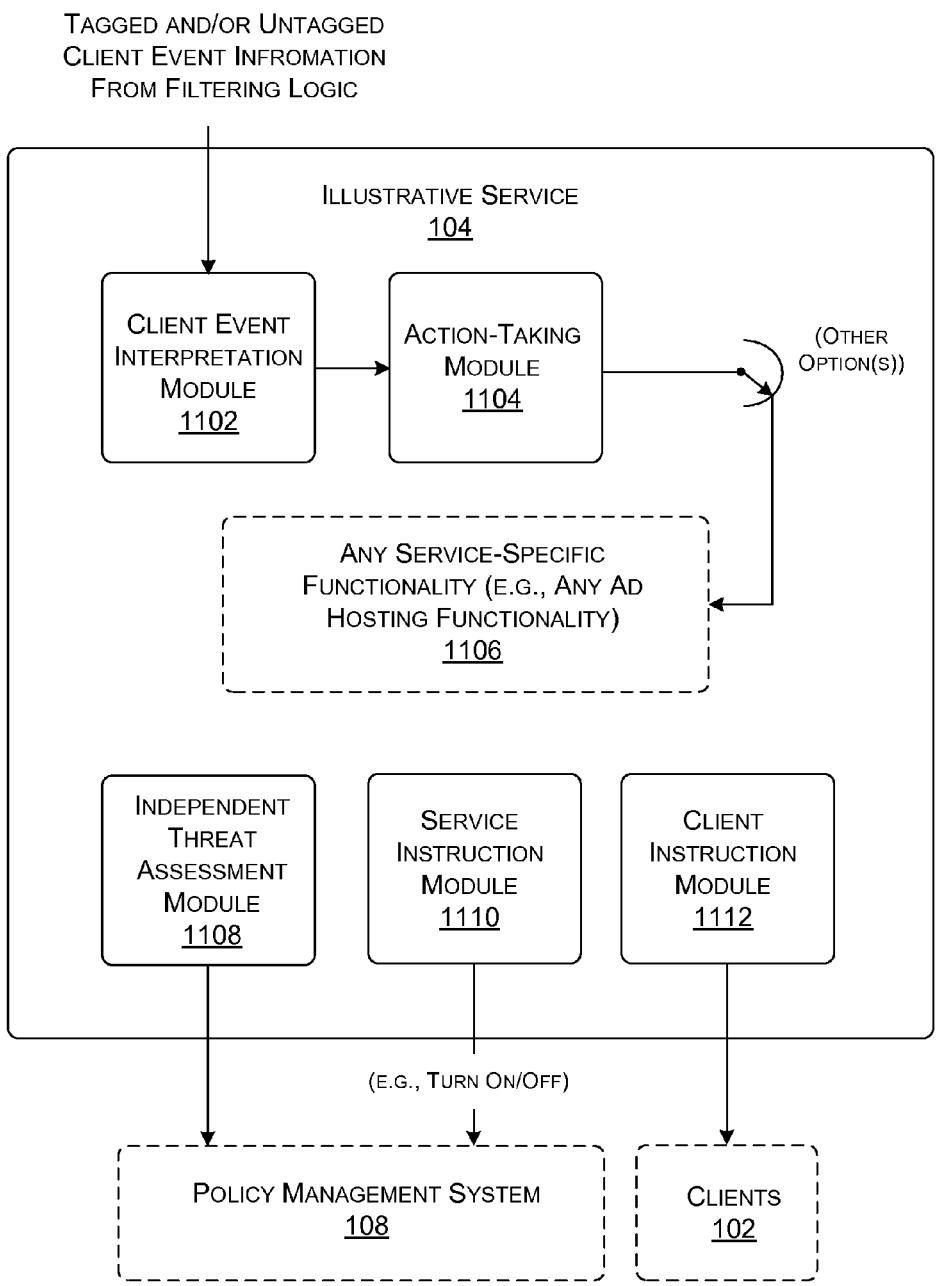
FIG. 11 provides illustrative details regarding the operation of a correlation assessment module, which is component of the rule generation module of FIG. 8.

FIG. 11 provides further details regarding the service 104 of FIG. 1. The service 104 can optionally include added functions to enable it to interact with the processing system 106. Alternatively, the service 104 can benefit from the processing system 106 without including any additional functionality.

The added functionality, if included, may include a client event interpretation module 1102. The client event interpretation module 1102 can read the tagging information contained in a received instance of CEI, if any. An action-taking module 1104 can then perform any appropriate action based on the tagging information and/or other factors. In one such action, the action-taking module 1104 can route white traffic to any service-specific functionality 1106, such as ad processing functionality in the case of an ad hosting service. The action-taking module 1104 can send gray traffic to a module which performs further analysis. The action taking module 1104 can block black traffic, if, in fact, this traffic is not already blocked by the filtering logic 110. In other cases, the operations performed by the client event interpretation module 1102 and the action-taking module 104 are incorporated in the filtering logic 106.

An independent threat assessment module 1108 performs any independent analysis on the CEI to detect malicious clients. The independent threat assessment module 1108 can then notify the policy management system 108 of its findings. The policy management system 108 can act on this notification in different ways, described above. To review, the policy management system 108 can treat the input from the service 104 as another instance of reputation information to be processed in the same manner as other reputation information from other reputation sources. Alternatively, or in addition, the policy management system 108 can give priority to the conclusions of the service 104, e.g., by blocking clients identified as being malicious by the service 104, independent of the processing set forth in connection with FIG. 8.

A service instruction module 1110 can provide any control instructions to the policy management system 108, which affect the operation of the policy management system 108 in any manner. In one case, the service instruction module 1110 can send an instruction which enables and disables the operation of the policy management system 108, as it affects the service 104. In another case, the service instruction module 1110 can send an instruction that modifies any parameter of an existing rule.

Figure 12:
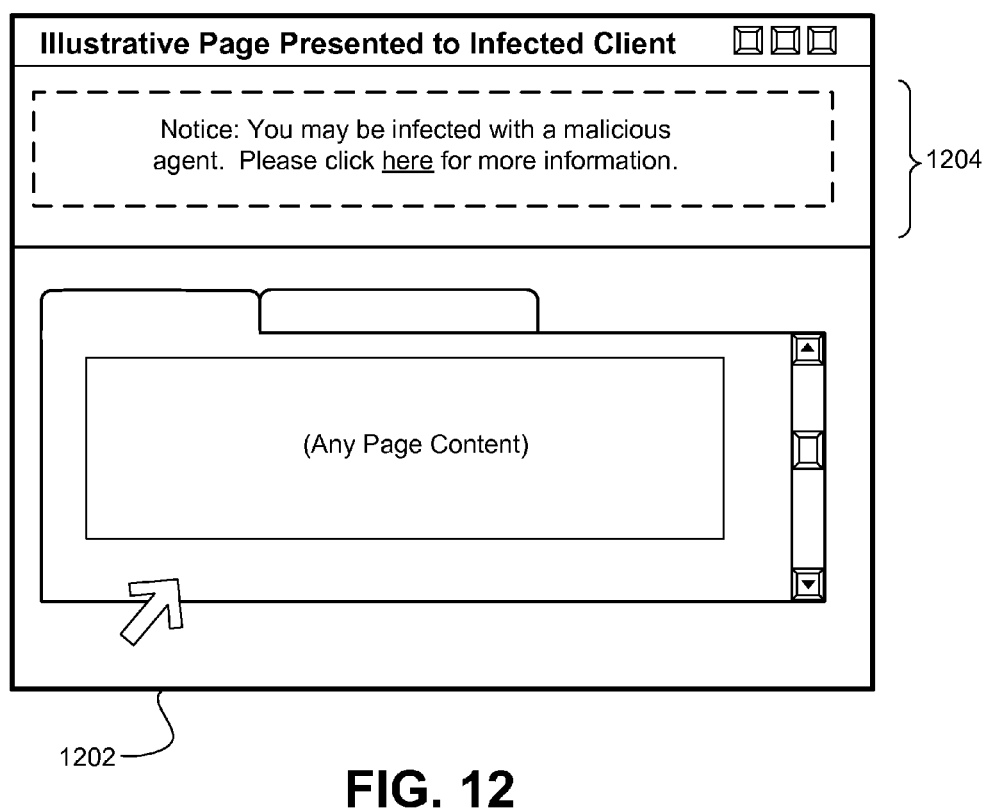
FIG. 12 provides illustrative details regarding the operation of a subnet assessment module, which is another component of the rule generation module of FIG. 8.

A client instruction module 1112 can optionally forward instructions and other information to the clients 102. For example, upon determining the existence of a malicious client (based on the service's own analysis or based on the conclusions reached by the policy management system 108), the client instruction module 1112 can forward a message to the client in question to inform it that it is potentially infected with a BOT. For example, FIG. 12 shows a page 1202 of content provided by a publishing site, having a slot 1204 in which the ad hosting service would normally display an advertisement. If the client that displays this page 1202 has been determined to be infected with a BOT, the client instruction module 1112 can display the BOT-notification message in the slot 1204, reading, for example, "Notice, You may be infected with a malicious agent. Please click here for more information."

B. Illustrative Processes

FIGS. 13-20 show procedures that explain one manner of operation of the environment 100 of FIG. 1. Since the principles underlying the operation of the environment 100 have already been described in Section A, certain operations will be addressed in summary fashion in this section.

Figure 13:
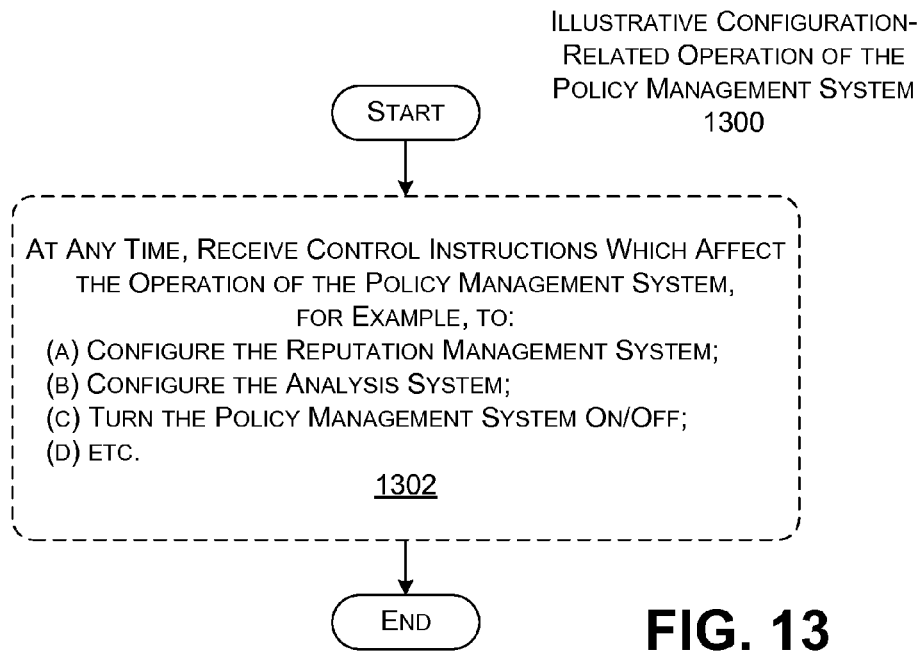
FIG. 13 is a flowchart which conveys illustrative configuration-related behavior of the policy management system of FIG. 1.

Starting with FIG. 13, this figure shows a procedure 1300 which conveys illustrative configuration-related behavior of the policy management system 108 of FIG. 1. In the sole block 1302, the policy management system 108 receives control instructions from various sources. For example, the policy management system 108 can receive instructions which serve to configure the reputation management system 124 or the analysis system 122 or individual rules in the analysis system 122. The policy management system 108 can also receive instructions which enable or disable the policy management system 108 as a whole. In one case, a service that is the beneficiary of the policy management system 108 may supply these control instructions.

Figure 14:
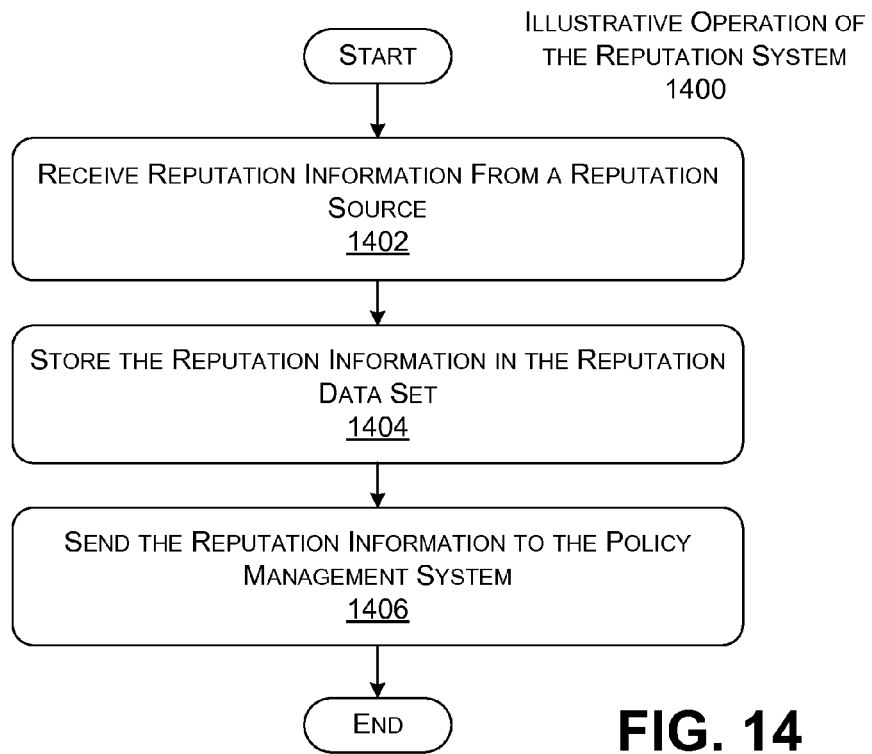
FIG. 14 is a flowchart which describes one manner of operation of the reputation management system of FIG. 7.

FIG. 14 shows a procedure 1400 which describes one manner of operation of the reputation management system 124 of FIG. 1. In block 1402, the reputation management system 124 receives reputation information from a reputation source, e.g., on a pull basis, a push basis, or combination thereof. In block 1404, the reputation management system 124 stores the reputation information in the reputation data set. In block 1406, the reputation management system 124 forwards the reputation information to the analysis system 122.

Figure 15:
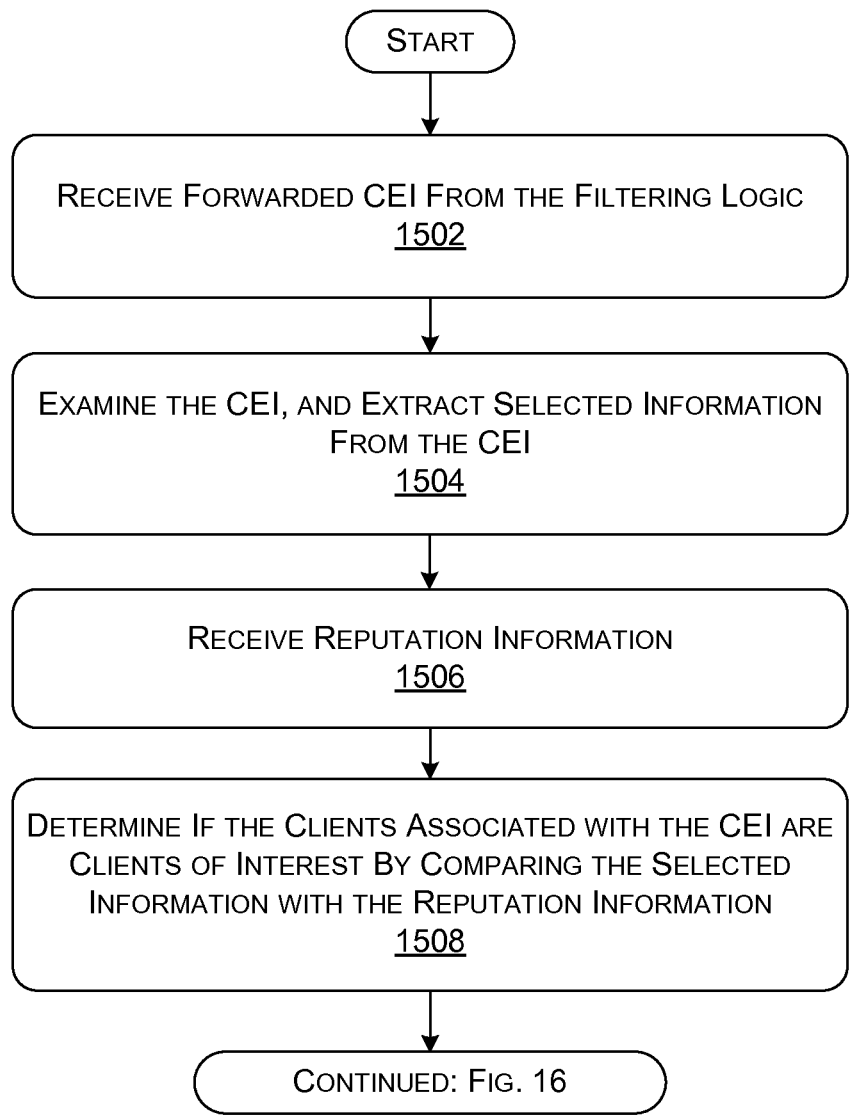
FIGS. 15-16 together comprise a flowchart which describes one manner of operation of the analysis system of FIG. 7.
Figure 16:
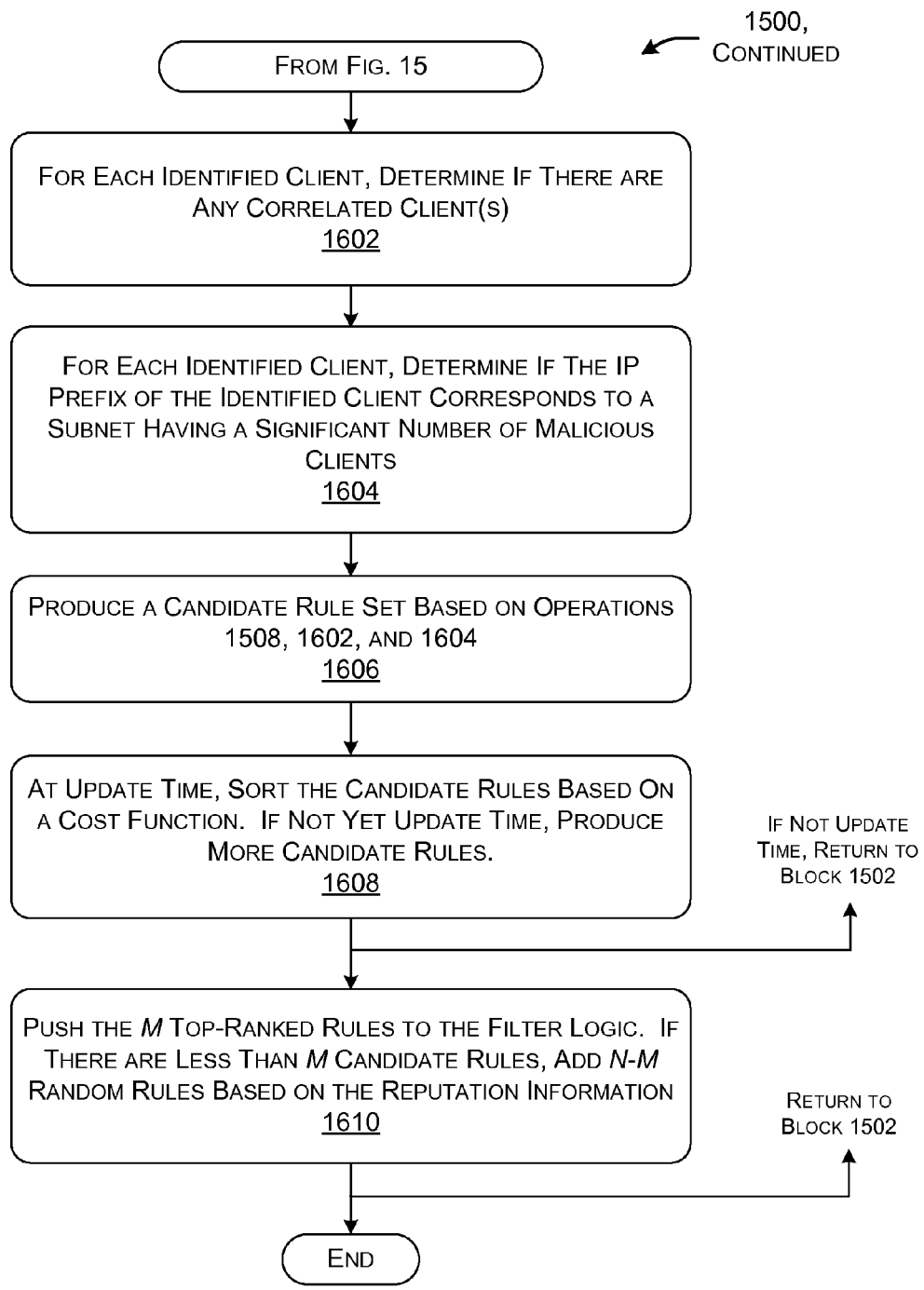

FIGS. 15-16 together show a procedure 1500 which describes one manner of operation of the analysis system 122 of FIG. 1. In block 1502, the analysis system 122 receives forwarded CEI from the filtering logic 110, which may comprise plural instances of CEI. In block 1504, the analysis system 122 examines the CEI and extracts selected information therefrom, such as the IDs of the clients which sent the CEI, the IDs of the services to which the CEI is headed, source and destination port information, and so on. In block 1506, the analysis system 122 receives reputation information from the reputation management system 124. In block 1508, the analysis system 122 determines if the clients associated with the CEI (received in block 1502) correspond to any malicious clients identified in the reputation information. In the terminology set forth in Section A, these malicious clients correspond to identified clients. The analysis system 122 stores a list of all detected identified clients.

Advancing to FIG. 16, in block 1602, the analysis system 122 determines whether each identified client exhibits behavior that is similar to one or more other clients. If so, the analysis system 122 can store the identities of these additional correlated clients. In block 1604, the analysis system 122 determines whether each identified client, and each correlated client, belongs to a subnet having a percentage of malicious clients that satisfies a prescribed threshold. If so, the analysis system 122 stores the identity of this subnet. In block 1606, the analysis system 122 produces a set of candidate rules based on the conclusions reached in blocks 1508, 1602, and 1604. The analysis system 122 can also take into consideration other factors and instructions when generating the candidate rules. For example, a service may independently identify malicious clients and ask the analysis system 122 to insert rules which block them, and/or perform some other action on the identified malicious clients. In another case, the analysis system 122 can generate rules based solely on the CEI (e.g., independent of the reputation information). In general, the set of candidate rules can be said to identify a list of candidate clients.

In block 1608, the analysis system 122 determines whether it is time to push a new set of rules to the filtering logic 110. For example, in one case, the analysis system 122 updates the rules in the filtering logic 110 at periodic intervals, e.g., every x minutes. Alternatively, or in addition, the analysis system 122 can update the rules on an event-driven basis, such as the accumulation of a prescribed number of new candidate rules in the data store 816. If the update time has arrived, in block 1608, the analysis system 122 sorts the candidate rules based on a cost function. This operation is described in greater detail below.

In block 1610, the analysis system 122 pushes the M top-ranked rules to the filter logic 110. That is, assume that there are N candidate rules in data store 816; further assume that there are M available slots for storing rules in the filtering logic 110. If M≤N, then the analysis system 122 will forward the M top-ranked rules to the filtering logic 110, and ignore the remaining N−M rules for the time being. In another case, assume that M>N. In this case, the analysis system 122 can push all M rules to the filtering logic 110, as well as M−N random rules. Each random rule targets a malicious client identified by the reputation information, but that malicious client has not yet been detected in recent CEI. In other words, such a random rule targets a client that is known to be malicious; but that client has not yet been observed to be actively attacking the service.

In other cases, each instance of reputation information may have severity scores associated therewith. For example, the reputation information, associated with a particular client, may have a hit count associated therewith. The hit count indicates the number of times that one or more reputation systems have flagged this client as being malicious. If this kind of severity information exists, the analysis system 122 can choose rules that target the clients having the highest severity scores. This strategy can be used instead of choosing random rules based on reputation information, or in addition to choosing random rules.

Further note that, when the analysis system 122 starts up, it may not have received any CEI from the filtering logic 122. But assume that the analysis system 122 does receive the reputation information from the reputation management system 124 at start up. In this case, the analysis system 122 can push a set of rules to the filtering logic 110 that is wholly or mostly determined based on the reputation information. As time progresses, the analysis system 122 can push increasingly more rules based on a combination of reputation information and CEI.

After block 1610, the procedure 1500 repeats its operation, e.g., by identifying additional malicious clients and fashioning rules based on these clients. Subsequent iterations of the procedure may have the effect of removing a subset of rules in the filtering logic 110, and substituting, in their place, new rules. In this manner, the analysis system 122 dynamically maintains a set of rules in the filtering logic 110 which address client that are: a) known to be malicious based on reputation information; and b) currently posing a threat to the service, or are expected to pose a threat to the service in the near future. And as noted above, in some circumstances, the analysis system 122 can propose rules based on factor (a) alone, or factor (b) alone.

The analysis system 122 performs the sorting in block 1608 based on one or more cost functions. Different cost functions can be formulated, each of which assigns a score to each candidate rule in the collection of N candidate rules in the data store 816. The analysis system 122 then picks the top M candidate rules based on the scores assigned by the cost function. That is, consider two malicious candidate clients having cost values $c_1$ and $c_2$, respectively. The analysis system 122 will be more apt to adopt a rule $r_1$ for the first client rather than a rule $r_2$ for a second client if $c_1 > c_2$ (although it is possible to define cost in the opposite manner too, such that the analysis system 122 will be more apt to adopt a rule for the first client rather than the second client if $c_1 < c_2$).

In one case, the cost function comprises a factor-based function, expressed as: $Cost=f(x)=\Sigma_{n=1}^{K}\alpha_n factor_n$, where $\Sigma_{n=1}^{K}\alpha_n=1$. In one implementation, there are two factors (that is K=2), including a recentness factor (that is, $factor_1$=recentness) and a frequency factor (that is, $factor_2$=frequency). The recentness factor is computed by first measuring a separation in time between a current point in time and the end of a last-received instance of CEI for a particular client under consideration (where the end of the last-received instance is reflected in timestamp information associated with that instance). This measurement is referred to as the "age" of that client, denoted as $age_{current}$. The frequency factor is computed by first measuring how many instances of CEI have been received for a client under consideration since it has been added into the candidate rule set (or in some other identified timeframe). This value is referred to as "count," denoted as $count_{current}$. When a client is first added to the candidate rule set, the $count_{current}$ for that client is set to zero.

In one implementation, the analysis system 122 measures $age_{current}$ in some type of time-based units (e.g., seconds), and measures $count_{current}$ in some type of count-based units. Further, the $age_{current}$ is measured using a different scale compared to $count_{current}$. To address this discrepancy, the analysis system 122 can compute a unit-less Cost value based on normalized versions of recentness and frequency.

More specifically, the normalized value of recentness may be computed as $recentness_{normalized}=(1-(age_{current}-age_{min})/(age_{max}-age_{min}))$. The symbol $age_{max}$ refers to the largest $age_{current}$ value exhibited by any client in the candidate list. Similarly, the symbol $age_{min}$ refers to the smallest $age_{current}$ value of any client in the candidate list. These largest and smallest age values may be assessed at the time at which it is desired to push a set of rules to the filtering logic 110, e.g., at the time that block 1608 is performed. Note that the $recentness_{normalized}$ value varies between 0 and 1. Further, a client having a more recent CEI instance (that is, a lower $age_{current}$ value) has a higher $recentness_{normalized}$ value.

The normalized value of frequency may be computed as $frequency_{normalized}=(count_{current}-count_{min})/(count_{max}-count_{min})$. The symbol $count_{max}$ refers to the largest $count_{current}$ value exhibited by any client in the candidate list. Similarly, the symbol $count_{min}$ refers to the smallest $count_{current}$ value that is exhibited by any client in the candidate list. Again, the $frequency_{normalized}$ value varies between 0 and 1. Further, a client having more CEI instances (that is, a higher $count_{current}$ value) has a higher $frequency_{normalized}$ value.

With the two factors described above, the cost function becomes $Cost=\alpha_1 * recentness_{normalized} + \alpha_2 * frequency_{normalized}$. If $\alpha_1=1$ and $\alpha_2=0$, the rule selection algorithm manifests a Least Recently Used (LRU) rule eviction policy. On the other hand, if $\alpha_1=0$ and $\alpha_2=1$, then the rule selection algorithm manifests a Least Frequency Used (LFU) rule eviction policy. The analysis system 122 can adopt a combination of LRU and LFU by choosing different combinations of $\alpha_1$ and $\alpha_2$.

In another case, the cost function comprises a function-based function, expressed as: $Cost=f(x)=\Sigma_{n=1}^{L}\beta_n f(pattern_n)$, where $\Sigma_{n=1}^{L}\beta_n=1$. In one implementation, there are two patterns (that is, L=2), including a flow duration (fd) pattern (that is, $pattern_1$=fd) and a flow inter-arrival (fiat) pattern (that is, $pattern_2$=fiat).

For an open connection, a current measurement of $fd_{current}$ is defined as the separation in time from the beginning of a CEI communication (e.g., a SYN packet of a TCP connection) to the current time, for a client under consideration. For a closed connection, fd is not computed. From a high level perspective, as the fd of an open flow increases, the chance of receiving more traffic for this flow decreases.

More specifically, in one formulation, $f(fd)=(1-fd_{normalized})$, where $fd_{normalized}$ corresponds to $(fd_{current}-fd_{min})/(fd_{max}-fd_{min})$. Here, the $fd_{max}$ value is the largest $fd_{current}$ value exhibited within a group of clients over an extended period of time, e.g., several hours or longer in one case. Similarly, the $fd_{min}$ value is the smallest $fd_{current}$ value exhibited within the group of clients over the extended period of time. In contrast to the factor-based computations described above, the group of clients that is considered when computing the $fd_{max}$ and $fd_{min}$ values may be more encompassing compared to the set of clients identified by the candidate list. More generally, the intent of this fd-related analysis is to use data patterns learned from historical data to predict the behavior of the current flow duration. The analysis system 122 clamps negative values to 0. Further, if a flow from a client is closed, the cost function associated with that client does not take into consideration the fd value (that is, $\beta_2=1$ and $\beta_1=0$).

A current measurement of fiat ($fiat_{current}$) measures the amount time current) between the current time and the time at which the previous flow has ended for a particular client under consideration. The end of the last flow may correspond to the receipt of a FIN packet for a TCP-based communication. From a high level perspective, as the fiat value that is measured with respect to a last-received flow increases, the probability of receiving this flow again, for this particular client, decreases. Note that the concept of flow inter-arrival time is related to the recentness measurement. But the pattern information that is used to compute the fiat value is gleaned from a larger amount of historical data compared to the recentness factor.

More specifically, in one formulation, $f(\text{fiat})=(1-\text{fiat}_{normalized})$, with negative values clamped to zero. Here, $\text{fiat}_{normalized}=(\text{fiat}_{current}-\text{fiat}_{min})/(\text{fiat}_{max}-\text{fiat}_{min})$. The $\text{fiat}_{max}$ and $\text{fiat}_{min}$ values are the largest and smallest, respectively, $\text{fiat}_{current}$ values exhibited within a group of clients over an extended period of time with respect to the relatively large group of clients described above (that is, not limited to the clients in the candidate list). More generally, this formulation uses historical fiat values to predict the behavior of the incoming instances of CEI. Note that when flow is open (e.g., when a SYN packet has been observed, but not a FIN packet), the value of fiat is not used, and therefore $\beta_2=0$ and $\beta_1=1$.

The above two types of cost functions are described by way of illustration, not limitation. Additional types of cost functions can be developed to suit the characteristics of particular environments.

The cost functions can also be modified to take into consideration other factors, such as priority levels associated with the candidate rules. For example, some rules may have elevated priority levels because they target clients that have been repeatedly identified by reputation systems as being malicious. In other words, these clients have high hit counts associated therewith. The cost function can also take into consideration whether each rule attempts to target a single IP address or multiple IP addresses, e.g., by favoring the latter rule over the former, in one case.

In other implementations, the ranking of clients using a cost function can precede the generation of rules in block 1606, rather than following block 1606. In this implementation, the candidate rule production module 814 would produce M rules to be sent to the filtering logic 110, rather than N rules.

As a final point, recall that the analysis system 122 can add a first set of rules to the set of candidate rules that target specific clients that are detected by the client-of-interest assessment module 806. These clients may be regarded as original clients. The analysis system 122 can add a second set of rules which target clients that are related to the original clients, e.g., as identified by the correlation assessment module 810. These clients may be regarded as correlated clients. The cost function analysis was described above for application to individual original clients. It can also be applied to the correlated clients. In one approach, for example, each of a set of correlated clients is considered to possess the same characteristics as the original client to which it relates. For example, a correlated client is given the same timestamp as its original counterpart client. Further, the count of a correlated client is set to zero at the same time as the original client's count is set to zero. According to one interpretation, a correlated client is considered to be engaging in an open transaction. The flow duration of a correlated client is based on the time duration between the time that this client was added to the candidate list and the current point in time.

As a related point, note that the ranking has been described above in the context in which each rule targets a client under consideration. But any rule may be associated with a subnet. This kind of rule targets plural clients. In one implementation, the analysis system 122 can assign a score to a rule associated with a subnet by treating the entire subnet as akin to a single client entity under consideration. And hence, the phrase "client under consideration" is to be broadly construed herein as any entity targeted by a rule (which may refer to one machine or plural machines). For example, the analysis system 122 can compute the frequency factor for a rule associated with a subnet by counting how many instances of CEI were received from this subnet since the rule was added to the candidate list. In general, however, note that the above-described manner of interpreting behavior associated with clients is presented by way of example, not limitation; as stated above, other implementations can use other scoring techniques.

Figure 17:
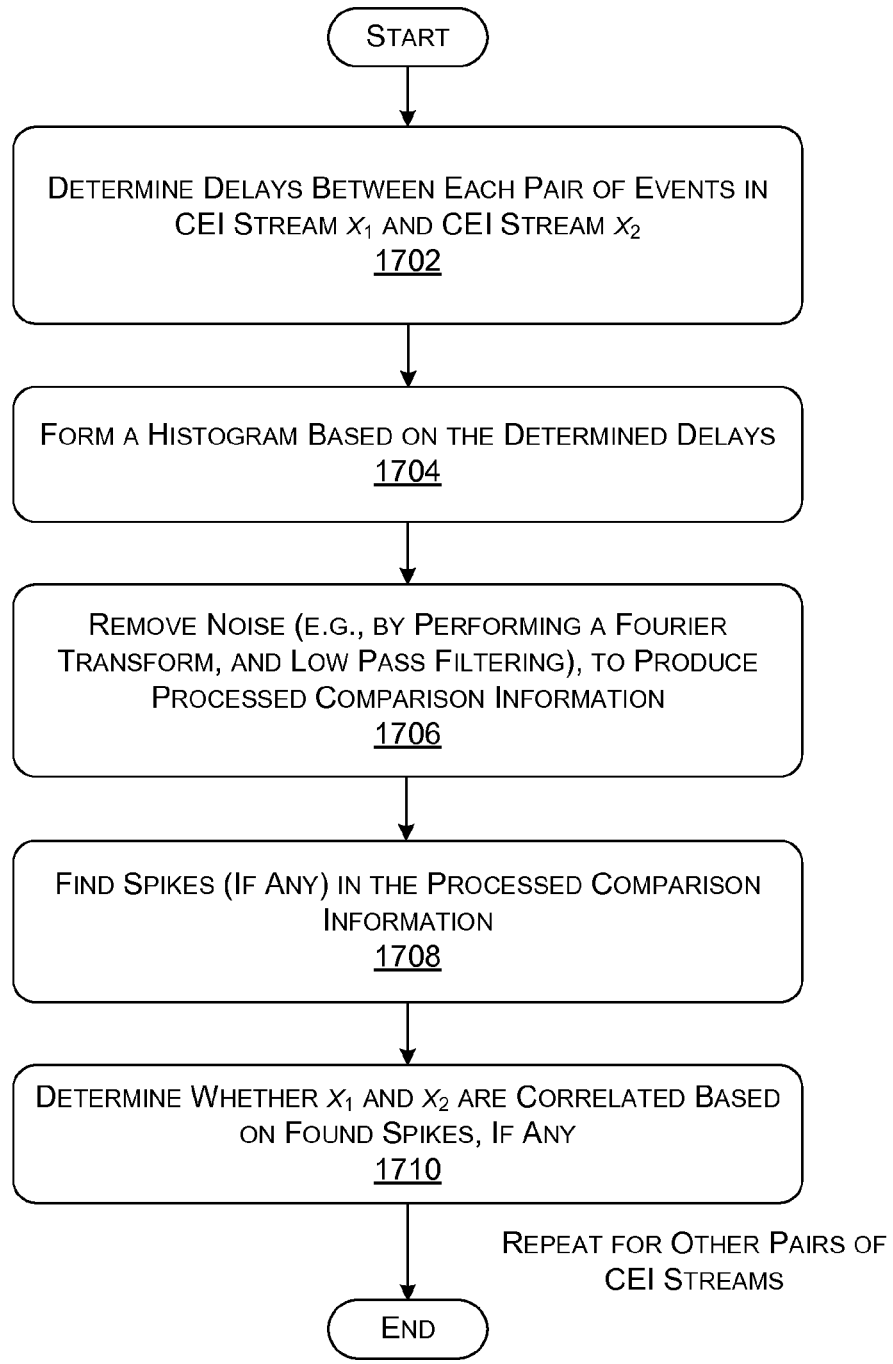
FIG. 17 is a flowchart which describes one manner of operation of the correlation assessment module of FIG. 8.

FIG. 17 shows a procedure 1700 which describes one manner of operation of the correlation assessment module 810 of FIG. 8. In block 1702, the correlation assessment module 810 determines delays between each pair of events in two CEI streams ($x_1$ and $x_2$), where $x_1$ is produced by a client identified as being malicious. In block 1704, the correlation assessment module 810 forms a histogram from the delays computed in block 1702. In block 1706, the correlation assessment module 810 removes noise by: (1) forming a Fourier transform of the time-series histogram produced in block 1704; (2) performing low-passing filtering to remove noise; and (3) converting the resultant information back into the time domain. This produces processed comparison information. In block 1708, the correlation assessment module 810 finds any spikes in the processed comparison information, defined as deviations exceeding a prescribed threshold magnitude. In block 1710, the correlation assessment module 810 determines whether $x_1$ and $x_2$ are correlated based on the existence of spikes, if any, found in block 1708.

Figure 18:
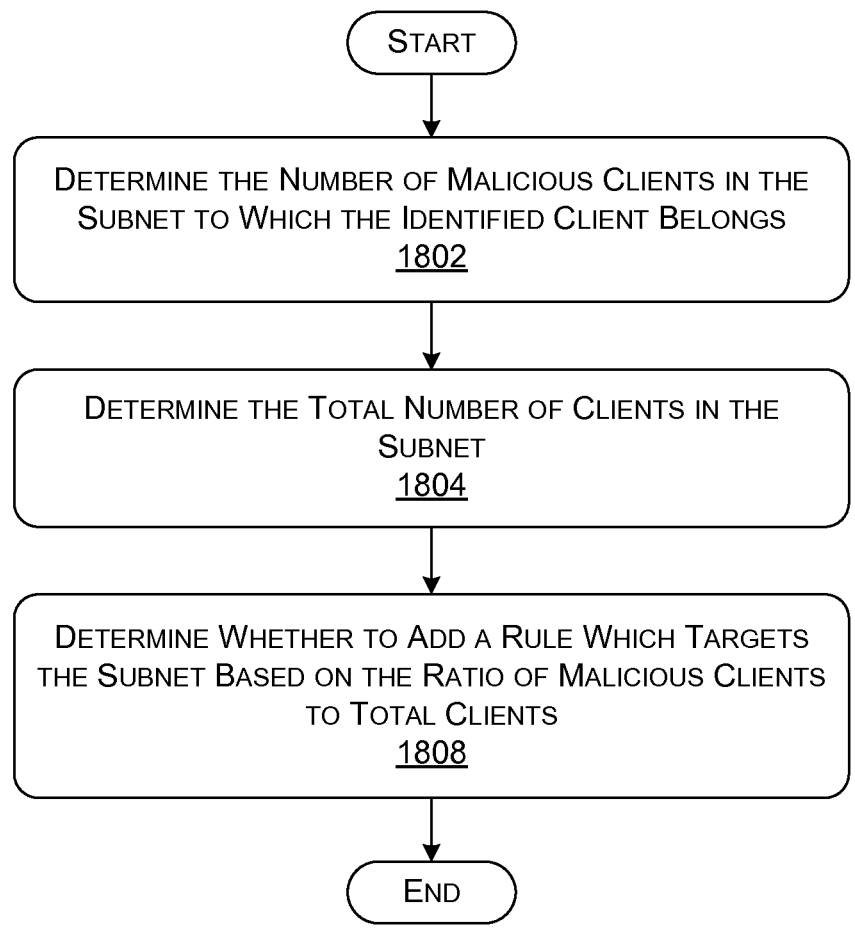
FIG. 18 is a flowchart which describes one manner of operation of the subnet assessment module of FIG. 8.

FIG. 18 shows a procedure 1800 which describes one manner of operation of the subnet assessment module 812 of FIG. 8. In block 1802, the subnet assessment module 812 determines the number of known malicious clients in the subnet to which the identified client belongs. That is, the prefix of the identified client defines the subnet of the identified client. In block 1804, the subnet assessment module 812 determines a total number of clients in the subnet. In block 1806, the subnet assessment module 812 determines whether to add a rule which targets the subnet as a whole based on the ratio of malicious clients to total clients.

Figure 19:
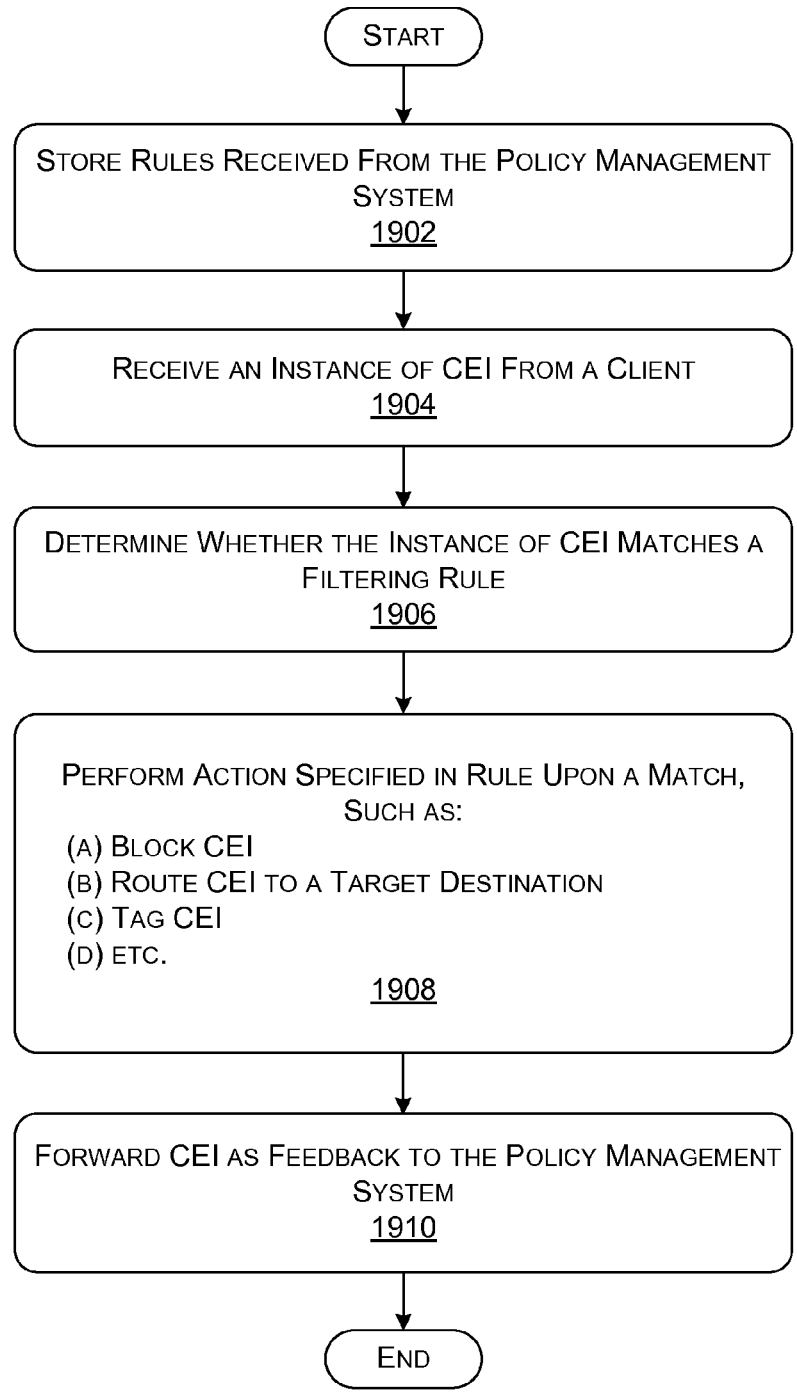
FIG. 19 is a flowchart which describes one manner of operation of the filtering logic of FIG. 1.

FIG. 19 shows a procedure 1900 which describes one manner of operation of the filtering logic 110 of FIG. 1. In block 1902, at update time, the filtering logic 110 receives a rule set from the policy management system 108. In block 1904, the filtering logic 110 receives an instance of CEI from a client. In block 1906, the filtering logic 110 determines whether the instance of CEI matches a rule, which may ultimately mean that the client associated with the CEI matches a client of interest specified in the reputation information. In block 1908, the filtering logic 110 performs any action based on the outcome of the determination of block 1906. Such actions may include, but are not limited to: blocking the instance of CEI; rerouting the instance of CEI; tagging the instance of CEI, and so on. In block 1910, the filtering logic 110 can forward the instance of CEI to the policy management system 108 for analysis and production of new rules. While FIG. 19 shows the block 1906 is a terminal operation, the filtering logic 110 can perform this operation at other stages in the operational flow of FIG. 19.

Figure 20:
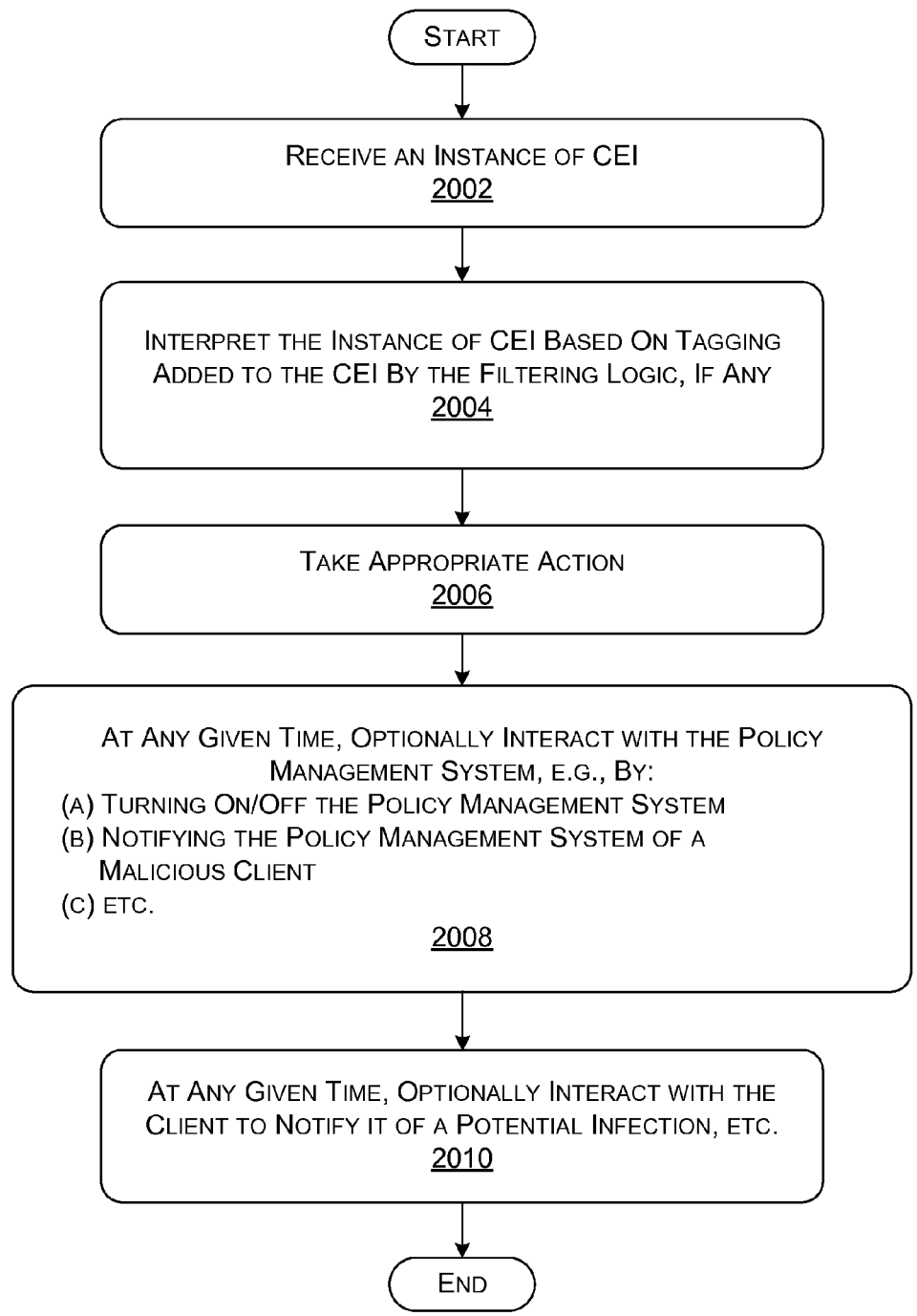
FIG. 20 is a flowchart which describes one manner of operation of an illustrative service.

FIG. 20 is procedure 2000 which describes one manner of operation of the illustrative service 104 of FIG. 1. In block 2002, the service 104 receives an instance of CEI, forwarded by the filtering logic 110. In block 2004, the service 104 examines the instance of CEI based on any tagging information added thereto and/or based on any other factor(s). In block 2006, the service 104 takes appropriate action with respect to the instance of CEI. For example, the service 104 may perform normal processing on a white-tagged instance of CEI. In block 2008, the service 104 may, at any given time, optionally interact with the policy management system 108. For example, the service 104 may notify the policy management system 108 of a malicious client; the service 104 may have detected this client based on its independent analysis. Or the service 104 may disable or enable the operations performed by the policy management system 108, as those operations affect the service 104. Or the service 104 may modify any parameter(s) of any rule(s). In block 2010, the service 104 can, at any given time, optionally interact with a client to notify it that it may be infected with a BOT.

C. Representative Computing Functionality

FIG. 21 sets forth illustrative computing functionality 2100 that can be used to implement any aspect of the functions described above. For example, the computing functionality 2100 corresponds to a type of computing equipment that can be used to implement any aspect of a client, the policy management system 108, the filtering logic 110, a service, a reputation system, and so on. In one case, the computing functionality 2100 may correspond to any type of computing device that includes one or more processing devices. In all cases, the computing functionality 2100 represents one or more physical and tangible processing mechanisms.

The computing functionality 2100 can include volatile and non-volatile memory, such as RAM 2102 and ROM 2104, as well as one or more processing devices 2106 (e.g., one or more CPUs, and/or one or more GPUs, etc.). The computing functionality 2100 also optionally includes various media devices 2108, such as a hard disk module, an optical disk module, and so forth. The computing functionality 2100 can perform various operations identified above when the processing device(s) 2106 executes instructions that are maintained by memory (e.g., RAM 2102, ROM 2104, or elsewhere).

More generally, instructions and other information can be stored on any computer readable medium 2110, including, but not limited to, static memory storage devices, magnetic storage devices, optical storage devices, and so on. The term computer readable medium also encompasses plural storage devices. The term computer readable medium also encompasses propagated signals, e.g., transmitted or received via physical conduit and/or air, etc. However, the specific terms computer readable storage medium and computer readable storage medium device expressly exclude propagated signals per se, while including all other forms of computer readable media.

The computing functionality 2100 also includes an input/output module 2112 for receiving various inputs (via input modules 2114), and for providing various outputs (via output modules). Illustrative input modules include a keyboard device, a mouse input device, a touchscreen input device, a gesture input device, a voice recognition mechanism, and so on. One particular output mechanism may include a presentation module 2116 and an associated graphical user interface (GUI) 2118. The computing functionality 2100 can also include one or more network interfaces 2120 for exchanging data with other devices via one or more communication conduits 2122. One or more communication buses 2124 communicatively couple the above-described components together.

The communication conduit(s) 2122 can be implemented in any manner, e.g., by a local area network, a wide area network (e.g., the Internet), etc., or any combination thereof. The communication conduit(s) 2122 can include any combination of hardwired links, wireless links, routers, gateway functionality, name servers, etc., governed by any protocol or combination of protocols.

Alternatively, or in addition, any of the functions described in the preceding sections can be performed, at least in part, by one or more hardware logic components. For example, without limitation, the computing functionality can be implemented using one or more of: Field-programmable Gate Arrays (FPGAs); Application-specific Integrated Circuits (ASICs); Application-specific Standard Products (ASSPs); System-on-a-chip systems (SOCs); Complex Programmable Logic Devices (CPLDs), etc.

In closing, the description may have described various concepts in the context of illustrative challenges or problems. This manner of explanation does not constitute an admission that others have appreciated and/or articulated the challenges or problems in the manner specified herein. Further, the claimed subject matter is not limited to implementations that solve any or all of the noted challenges/problems.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A policy management system, comprising:
 a processing device for implementing computing functionality comprising:
 a reputation management system, comprising:
  logic configured to receive reputation information from at least one reputation system, each instance of the reputation information identifying at least one client of interest and corresponding behaviors relating to attempts to access at least one service; and
  logic configured to store the reputation information in a reputation data set; and
 an analysis system comprising:
  logic configured to receive the reputation information from the reputation management system;
  logic configured to receive forwarded client event information provided by filtering logic, the filtering logic being provided within network infrastructure that connects clients to the at least one service, the client event information identifying behaviors relating to attempts to access the at least one service;
  logic configured to generate at least one rule based on at least one instance of the reputation information in combination with the forwarded client event information; and
  logic configured to deploy said at least one rule in the filtering logic, for the use by the filtering logic in filtering new client event information, produced by the clients, the new client event information being directed to said at least one service.

2. The policy management system of claim 1, wherein said at least one reputation system is configured to generate an instance of the reputation information when it determines that a malicious client has performed a specified act within a network environment.

3. The policy management system of claim 1, furthering including logic configured to receive and act on control instructions provided by said at least one service.

4. A computer readable storage device for storing computer readable instructions, the computer readable instructions providing an analysis system when executed by one or more processing devices, the computer readable instructions comprising:

logic configured to receive a forwarded instance of client event information from filtering logic, the forwarded instance of client event information being generated in response to an attempt by a new client to interact with a service;

logic configured to extract selected information from the forwarded instance of client event information;

logic configured to receive reputation information provided by at least one reputation system, the reputation information identifying at least one client of interest and corresponding behaviors relating to attempts to access at least one service;

logic configured to compare the selected information with the reputation information to determine whether the forwarded instance of client event information is similar to the reputation information of any of the clients of interest, the new client being referred to as an identified client if the client event information is similar to the reputation information;

logic configured to produce at least one rule that is associated with the identified client from the reputation information and the client event information; and logic configured to deploy said at least one rule in the filtering logic, for subsequent use by the filtering logic in filtering new client event information of other new clients.

5. The computer readable storage device of claim 4, wherein the instructions further comprise:

logic configured to determine whether the identified client exhibits behavior that is similar to at least one other client, wherein said at least one rule, produced by said logic configured to produce, identifies both the identified client and said at least one other client.

6. The computer readable storage device of claim 4, wherein the instructions further comprise:

logic configured to determine whether the identified client is a member of a subnet that has a number of clients of interest that satisfies a prescribed threshold, wherein said at least one rule, produced by said logic configured to produce, identifies all clients in the subnet.

7. The computer readable storage device of claim 4, wherein the analysis system operates by producing a plurality of candidate rules, and wherein the instructions further comprise:

logic configured to sort the candidate rules using a specified cost function, to provide a sorted list of candidate rules having N entries, wherein the filtering logic has a capacity which accommodates storage of M rules.

8. The computer readable storage device of claim 7, wherein the instructions further comprise:

logic configured to provide M top-ranked candidate rules from the list of candidate rules to the filtering logic, provided that $N \geq M$; and logic configured to additionally provide M−N random rules, provided that $N<M$, the M−N rules being generated based on clients of interest specified in the reputation information.

9. The computer readable storage device of claim 7, wherein, for each client entity under consideration, the cost function takes into consideration one or more of:

at least one factor which reflects how recently the client entity under consideration has sent client event information;

at least one factor which reflects how frequently the client entity under consideration has sent client event information; and at least one factor which reflects a duration of a connection associated with the client entity under consideration.

10. A method, performed by physical computing functionality, for filtering client event information, comprising the steps of:

storing a plurality of rules in a data store of filtering logic;

wherein each rule in the plurality of rules is generated, in part, based on reputation information received from at least one reputation system, each instance of the reputation information identifying at least one client of interest and behaviors by the at least one client of interest that reflects activity performed by the at least one client of interest in an attempt to interact with at least one service;

receiving an instance of client event information from a new client that reflects activity performed by the new client in an attempt to interact with a service;

determining whether the instance of client event information matches a rule in the plurality of rules, to identify a matching rule upon a match; and performing an action on the instance of client event information, as specified by the matching rule, prior to forwarding the instance of client event information to the service.

11. The method of claim 10, wherein the service corresponds to an ad hosting service, and wherein the action is performed to reduce instances of fraudulent client event information reaching the ad hosting service.

12. The method of claim 10, wherein the action corresponds to one or more of:

blocking further propagation of the instance of client event information;

routing the instance of client event information to at least one target destination; and tagging the instance of client event information with tagging information.

13. The method of claim 10, wherein at least one rule specifies a single client of interest.

14. The method of claim 10, wherein at least one rule includes a mask that specifies two or more clients of interest.

15. The method of claim 14, wherein said two or more clients of interest have been determined, by a policy management system, to belong to an identified subnet having a prescribed number of clients of interest.

16. The method of claim 10, wherein the filtering logic corresponds to at least one filtering unit added to existing filtering infrastructure, said at least one filtering unit being dedicated to performing said storing, receiving, determining, and performing, and the existing filtering infrastructure performing other filtering tasks besides said storing, receiving, determining, and performing.

17. The method of claim 10, wherein the filtering logic corresponds to supplemental functions added to existing filtering infrastructure, the existing filtering infrastructure performing other filtering tasks besides said storing, receiving, determining, and performing.

18. The method of claim 10, wherein the filtering logic corresponds to a hierarchy of filtering units, each filtering unit storing a subset of the plurality of rules.

19. The method of claim 10, further comprising forwarding client event information to a policy management system, to provide forwarded client event information, wherein the policy management system uses the forwarded client event information, together with reputation information received from at least one reputation system, to generate updated rules.

* * * * *